US012636620B2

(12) United States Patent
Bishop et al.

(10) Patent No.: US 12,636,620 B2
(45) Date of Patent: May 26, 2026

(54) SYSTEMS AND METHODS FOR TREATMENT OF ELEVATED ORGANIC CONTENT STREAMS

(71) Applicant: SPINOVO LLC, Billerica, MA (US)

(72) Inventors: Bruce Bishop, Arlington, MA (US); Stanton Russel Smith, Waltham, MA (US)

(73) Assignee: SPINOVO LLC, Billerica, MA (US)

( * ) Notice: Subject to any disclaimer, the term of this patent is extended or adjusted under 35 U.S.C. 154(b) by 859 days.

(21) Appl. No.: 17/809,447

(22) Filed: Jun. 28, 2022

(65) Prior Publication Data

US 2022/0323909 A1      Oct. 13, 2022

Related U.S. Application Data

(63) Continuation of application No. PCT/US2021/070025, filed on Jan. 13, 2021.
(Continued)

(51) Int. Cl.
*B01D 69/06*        (2006.01)
*B01D 61/02*        (2006.01)
(Continued)

(52) U.S. Cl.
CPC ........... *B01D 69/06* (2013.01); *B01D 61/029* (2022.08); *B01D 63/0822* (2022.08); *B01D 63/10* (2013.01); *B01D 63/107* (2022.08); *B01D 2311/2523* (2022.08); *B01D 2313/143* (2013.01); *B01D 2321/06* (2013.01); *B01D 2325/24* (2013.01)

(58) Field of Classification Search
CPC .. B01D 69/06; B01D 61/029; B01D 63/0822; B01D 63/10; B01D 63/107; B01D 2311/2523; B01D 2313/143; B01D 2321/06; B01D 2325/24; B01D 61/025; B01D 61/06; B01D 65/02; B01D 61/58; B01D 65/08
See application file for complete search history.

(56) References Cited

U.S. PATENT DOCUMENTS 7,732,173 B2      6/2010   Mairal et al.
9,925,494 B2      3/2018   Mcgovern et al.
(Continued)

OTHER PUBLICATIONS

Engineering Computations, vol. 17 No. 3, 2000, pp. 192-217. (Year: 2000).*
(Continued)

*Primary Examiner* — Pranav N Patel
(74) *Attorney, Agent, or Firm* — Secant Intellectual Property Law

(57)        ABSTRACT

The present disclosure provides systems and methods that can treat feeds with elevated organic levels, e.g., feeds with ≥300 Pascals (Pa) organic osmotic pressure, with one or more enhanced filter membrane modules, which may be referred to herein as membrane modules or simply modules. Preferably, a filter membrane module consistent with the present disclosure include one or more plate and frame modules, one or more spiral format modules, or a combination of plate a frame and spiral format modules. The systems and methods provided herein can provide reliable performance when used to treat feeds with elevated organic levels.

18 Claims, 14 Drawing Sheets

100A

Related U.S. Application Data

(60) Provisional application No. 62/960,209, filed on Jan. 13, 2020.

(51) Int. Cl.
  B01D 63/08      (2006.01)
  B01D 63/10      (2006.01)

(56)              References Cited

U.S. PATENT DOCUMENTS

| | | | |
|---|---|---|---|
| 9,975,090 B2 | 5/2018 | Hoffman | |
| 2003/0205520 A1* | 11/2003 | Johnson | B01D 63/103 |
| | | | 210/321.83 |
| 2012/0000851 A1* | 1/2012 | Vuong | B01D 63/082 |
| | | | 210/636 |
| 2013/0115588 A1 | 5/2013 | Davis et al. | |
| 2015/0041388 A1* | 2/2015 | Hirozawa | B01D 69/04 |
| | | | 210/457 |
| 2017/0209834 A1* | 7/2017 | Cohen | B01D 61/22 |
| 2019/0209976 A1 | 7/2019 | Livazovic et al. | |

OTHER PUBLICATIONS

Desalination 146 (2002) 187-194. (Year: 2002).*
International Search Report and Written Opinion from corresponding PCT Appln. No. PCT/US21/70025, dated Apr. 6, 2021. 15 pages.
Diltz, et al., "Reverse Osmosis Processing of Organic Model Compounds and Fermentation Broths", Bioresource Technology 98, 2006, p. 686-695.
Haidari, et al., "Determining Effects of Spacer Orientations on Channel Hydraulic Conditions Using PIV", Journal of Water Process Engineering, 31, 2019, 10 pages.
Jung, et al., "Quantifying Concentration Polarization—Raman Microspectroscopy for In-Situ Measuremant in a Flat Sheet Crossflow Nanofiltration Membrane Unit", Scientific Reports, 2019, pp. 1-11.

* cited by examiner

300

| Feed conc., (% NaCl) | Spacer thickness, 0.1168 cm | | Spacer thickness, 0.0711 cm | | Spacer thickness, 0.0508 cm | |
|---|---|---|---|---|---|---|
| | Permeate flux, L/m²h | Permeate volume flow rate, L/h | Permeate flux, L/m²h | Permeate volume flow rate, L/h | Permeate flux, L/m²h | Permeate volume flow rate, L/h |
| 0 | 63 | 119 | 58 | 152 | 29 | 90 |
| 1 | 50 | 95 | 44 | 123 | 23 | 69 |
| 2 | 36 | 68 | 31 | 82 | 16 | 46 |
| 3 | 25 | 48 | 24 | 62 | 11 | 34 |
| 4 | 27 | 52 | 21 | 53 | 11 | 33 |
| 5 | 16 | 31 | 13 | 34 | 7 | 21 |

FIG. 3

Axes in millimeters

800

FEED PUMP
802

FLOW INDICATOR
806

FEED LINE
808

FEED TANK
804

COCENTRATE OUTLET
812

RECIRCULATION PUMP
826

TEMPERATURE
INDICATOR
810

PERMEATE OUTLET
814

PREFILTER
816

MEMBRANE MODULE
818

PRESSURE INDICATOR
824

CHILLER
820

CHILLER PUMP
822

SYSTEMS AND METHODS FOR TREATMENT OF ELEVATED ORGANIC CONTENT STREAMS

RELATED APPLICATIONS

The present disclosure is a continuation of PCT/US2021/070025 filed on Jan. 13, 2021, which claims the benefit of U.S. Provisional App. No. 62/960,209 entitled "Systems and Methods for Treatment of Elevated Organic Content Streams" and filed on Jan. 13, 2020, all of which are incorporated in the entirety by reference.

FIELD

The present disclosure relates to systems and methods for treatment of elevated organic content streams.

BRIEF DESCRIPTION OF THE DRAWINGS

FIG. 3 is a table showing the flow rate of a commercial spiral module with different feed and salinity, and different feed spacers.

DETAILED DESCRIPTION

Figure 1A:
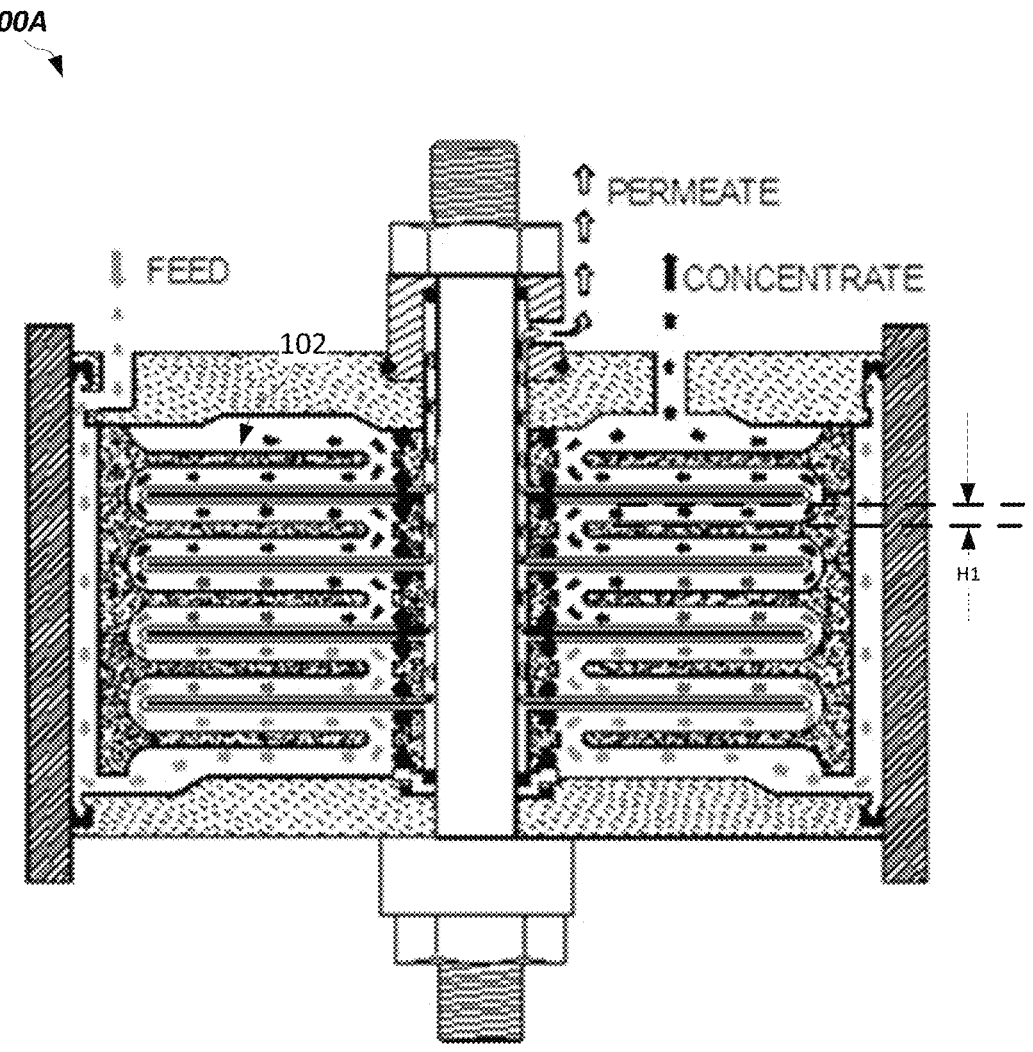
FIG. 1A is a cross sectional diagram of a plate and frame filter module consistent with the present disclosure.

Microfiltration (MF), ultrafiltration (UF), nanofiltration (NF) and reverse osmosis (RO) have been used in industry to treat water and manage organics for a number of years. Although effective for some applications, such methods often use standard spiral membranes and associated systems that have a limited ability to handle streams that contain a high level of organics (e.g., streams with an organic osmotic pressure greater than 300 Pa). Indeed, many manufacturers of such membranes advise against direct filtering of streams with a relatively high level of organics as fouling, premature failure and/or reduced filter membrane lifespan can occur, e.g., based on the necessity of frequent caustic washing and other such cleaning routines which reduce membrane useful life. Simply put, increased organics in feed streams can result in the relatively rapid onset of conditions that can render filter membranes inoperable within a matter of a few minutes depending on the particular circumstances, and even when carefully monitored and maintained, frequent and destructive cleaning processes of filter membranes significantly shorten operational lifespans.

One approach to avoid such scenarios is to introduce pre-treatment of streams to reduce organics in feed streams. However, such pre-treatment mitigation schemes can require significant costs both in initial hardware and installation, as well as higher operational costs due to component failure and maintenance. There exists a need to allow for filtration of feed streams with elevated organic levels, e.g., >=300 Pascals (Pa), without the necessity of pre-treatment schemes and/or the necessity of frequent and destructive cleaning routines and the loss of productivity due to associated down times.

The present disclosure provides systems and methods that can treat feeds with elevated organic levels, e.g., feeds with ≥300 Pa organic osmotic pressure (or ≥0.003 bar), with one or more enhanced filter membrane modules, which may be referred to herein as membrane modules or simply modules. Preferably, a filter membrane module consistent with the present disclosure includes one or more plate and frame modules, one or more spiral format modules, or a combination of plate and frame and spiral format modules. The systems and methods provided herein aim to provide reliable performance when used to treat feeds with such elevated organic levels.

As generally referred to herein, the term elevated organic levels (which may also be referred to as simply elevated organics) refer to feed/water with an organic osmotic pressure of equal to or greater than 300 Pa unless otherwise provided. The present disclosure has recognized that organic concentrations within feed introduce a proportional amount of organic osmotic pressure, and this quantity may be predetermined or empirically measured for a given stream to determine characteristics of filter membrane modules, e.g., feed channel height, membrane format/types, and operational characteristics/parameters for filtration systems that use such filter membrane modules, e.g. open channel average velocity, and/or elevated membrane feed-side pressure drop, which enables filtration of feed with elevated organic levels, and preferably direct filtration of such elevated organic feed streams using one or more filter membrane modules consistent with the present disclosure that does not necessitate pretreatment of organics or other similar mitigation strategies.

As generally referred to herein, the open channel average velocity refers to the feed volumetric flow rate at a location inside membrane module divided by the average cross-sectional open area for flow in the membrane module. One example calculation for determining open channel average velocity of a filter membrane is 8" diameter spiral membrane module with nominally 50% of the cross-sectional area open for flow, which has a feed flow rate of 80 gallons per minute. The cross-sectional open area for flow of the module is $50\% \times pi \times (8\ inches/2)\hat{2}=25.1$ square inches or 0.016 m2. The flow rate of 80 gallon per minute can be converted to 0.005 m3/second. And so the open channel velocity of this membrane is 0.005 m3/second/0.016 m2=0.32 m/second or 1.05 feet/second.

Stated more simply, aspects of the present disclosure allow for filter membrane modules to be provided feed (directly) with elevated organic levels while still allowing for filtration operations to occur, and preferably filtering operations that achieve at least 30% recovery over a predetermined, uninterrupted period of operation, without the rapid onset of scaling/fouling that would otherwise be expected to occur.

Aspects and features of the present disclosure are applicable to a wide range of filter/filtration systems that seek to provide filtration of feed streams with elevated organics including those that utilize batch reverse osmosis (RO), continuous permeate output (e.g., less than 100% recovery), energy recovery schemes, feed recirculation loops, feed tank pre-stages, or any combination thereof.

The plate and frame and spiral membrane modules described herein preferably enable the same membrane types that are used in conventional spiral membranes (e.g., MF, UF, NF, RO) but with modifications that allow the same to handle significantly higher levels of feed organics. In one preferred example, the features of the membrane modules described herein can be combined with operational parameters as discussed above (e.g., elevated membrane feed-side pressure drop) to lead to significantly increased mass transfer. As a result, organics in the boundary layer are not over-concentrated and instead are maintained in suspension, thus allowing higher levels of organics to be managed in the feed stream. Consequently, the systems and methods described herein can be used in applications often considered impracticable for systems and methods that employ standard spiral membranes, or which would lead to unacceptably high failure rate when standard spiral membranes are used.

As discussed above, aspects of the present disclosure are related to filter modules and system designs that enable successful treatment of streams that contain elevated levels of organics, e.g., streams with an organic osmotic pressure ≥300 Pa, such as ≥1500 Pa, or even ≥3000 Pa. Such systems and methods may be tailored for use in specific targeted applications, such as but not limited removal of perfluoro alkyl substances (PFAS) from water. Filter modules consistent with the present disclosure can be utilized in a retrofit fashion in existing filtration systems, and also can be incorporated into new process solutions/designs that have various target applications.

In numerous markets there is a desire to remove, concentrate, purify or otherwise process feed streams with elevated levels of organics, typically with chemical oxygen demand (COD) over 100 milligrams per liter (mg/l). Treatment of such streams generally can be achieved by membranes in the MF, UF, NF and RO pore sizes. However, existing membranes in the market space are spiral wound and hollow fiber membranes which have been specifically designed for mainstream water treatment applications, including ground water, surface water and sea water desalination. Such membranes may have a high membrane packing density (membrane area per unit module volume) and low available feed volume. Consequently, such membranes may offer limited hydraulic enhancement options, and are often operated at or near dead-end mode with minimal energy use.

The features of such existing membranes are therefore suited to the mainstream market as they can enable reduced footprint, low capital, and low operating cost in large scale water applications. However, filter modules containing such membranes do not perform well in cases where the feed is highly contaminated with dissolved organic materials and suspended matter. While suspended solids can be removed with various available technologies, removal of organics remains challenging. Removal of macromolecular and dissolved organics is particularly challenging, as they are not easily removed by gravity separation and/or coarse filtration.

Organics in the form of small oil emulsion droplets can be removed using tubular and also spiral ultrafiltration membranes with substantial feed flow passages that allow both concentration and efficient removal of the oil. These feed flow passages (also referred to as feed channels) are typically in the range of 1 to 3 mm in size and can achieve over 3 percent volume of oil concentration. However, a significant difference between low pressure membrane filtration such as microfiltration and looser ultrafiltration, and higher-pressure filtration such as tight ultrafiltration, nanofiltration and reverse osmosis, is that low pressure filtration only concentrates macromolecules and particulates.

As such, the boundary layer in nanofiltration and reverse osmosis contains salinity, scale formers, dissolved and macromolecular matter, and suspended matter if not removed by pre-treatment. The additional concentration of dissolved materials in high pressure membrane filtration results in a more complex boundary layer with more challenging fluid dynamics and significantly more complicated rheology, especially near to the membrane surface. Viscosity, diffusivity, density, osmotic pressure vary with concentration, but potentially also with shear stress, and concentration and shear stress vary with position relative to the membrane surface. In particular, dissolved organics can have a significant impact on the viscosity, osmotic pressure and diffusivity.

For example, considering dextran as a model organic contaminant, it has been shown that relative diffusivity of dextran decreases from 3.36 to 1 as the molecular weight of dextran increased from 46 to 500 kilodaltons. When considering that flux is linearly proportional to diffusivity, the present disclosure recognizes that the productivity of a filter membrane module can be influenced by the organic content in the feed. It has also been shown that a relationship exists between organic concentration and solution viscosity, osmotic pressure, and density, each of which can contribute to the complexity of the rheology in the boundary layer near the membrane.

In addition to the foregoing, this disclosure recognizes that organics in a feed stream can provide a significant contribution to osmotic pressure, which is additive with other dissolved components. As a result, this disclosure further recognizes that a high pressure membrane device, e.g., capable of withstanding internal pressures in the range of 70 to 90 bar or greater, may be used to remove organics while managing/withstanding process requirements. Organic concentration as osmotic pressure captures both the concentration and osmotic effect, which is an important factor for membrane filtration. The effect of organic substances on the membrane process pressure can be substantial, as shown in example 1 described further below.

As noted above, commercially available membrane modules often do not adequately perform when they are used to treat feed streams that present a complex mass transfer environment, such as feed streams with elevated organic content. Such membrane modules generally employ a high packing density that is configured for treatment of cleaner water sources, e.g., having organic osmotic pressures of 300 Pa or less, such as ground or surface water. As a result, commercial membranes often experience reduced flux and require frequent cleaning, leading to unacceptable amounts of downtime that can eventually lead to system shutdown and decommissioning.

With the foregoing in mind, the present disclosure relates to systems and methods for treating challenging feed streams, such as feed streams that include an elevated organic content, e.g., greater than 300 Pa. As discussed below, the systems and methods preferably utilize one or a combination of a non-spiral module with enhanced feed flow pattern, and an application-specific spiral module. The non-spiral module preferably uses a circular plate and frame membrane with a relatively large number of plates and frames stacked in series around a central permeate collection conduit as shown in FIG. 1A.

The number of plates and/or frames in the non-spiral module may range from greater than or equal to 25, greater than or equal to 50, greater than or equal to 75, greater than or equal to 100, or even greater than or equal to 200. Without limitation, the number of plates and frames in the non-spiral module is greater than or equal to 100. The geometry of the non-spiral module is preferably configured to produce fluid dynamics that enable handling feed with elevated levels of organics in the concentrate. For example, the non-spiral module can preferably handle feeds and concentrates with an organic osmotic pressure greater than or equal to 300 Pa, greater than or equal to 1500 Pa, or even greater than or equal to 3000 Pa.

In embodiments, a spiral module consistent with the present disclosure is preferably configured to treat more moderate feed organic levels, relative to the organic levels treated with the plate and frame modules described herein, e.g., organic levels in the range of 1,000 to 500,000 Pa, or at least 300 Pa. When accounting for typical 15 to 20 psid allowed pressure drop along the length of a typical spiral membrane module, this disclosure recognizes that adjustments to the structure of the spiral module can be made to improve, enhance, and/or otherwise optimize the treatment of feed containing an elevated organic content with the spiral module.

For example, within a standard diameter and length envelope of commercial spiral modules, e.g., 8 inches in diameter and 40 inches long, this disclosure has identified that performance of a module could be increased by selection of spacer thickness and/or spacer style. This disclosure has also recognized that higher shear rate (e.g., generally measured as feed-side pressure drop) can improve surface cleaning of the membrane. Without wishing to be bound by theory, it is postulated that the increased shear acts to "scrape" the membrane surface clean while increased turbulence enhances back transport of solute back into the bulk. By adjusting the shear and turbulence, the present disclosure has led to creation of a module in which concentration at the membrane surface was reduced, thus resulting in a more accessible and more active membrane surface for solvent transport, while also simultaneously allowing for higher permeate quality.

In the context of this disclosure, an aim of the structural modifications is on modifying, enhancing, and/or otherwise optimizing permeate flow rate from a membrane module of defined size, e.g., 8 inches in diameter and 40 inches long (e.g., a typical commercial module envelope).

Returning to the plate and frame module 100A of FIG. 1A, the present disclosure recognizes that feed channel height H1 and feed flow rate can be controlled to adjust flow to achieve a desired shear-flow profile within feed channel 102, which may also be referred to herein as a channel.

Figure 2:
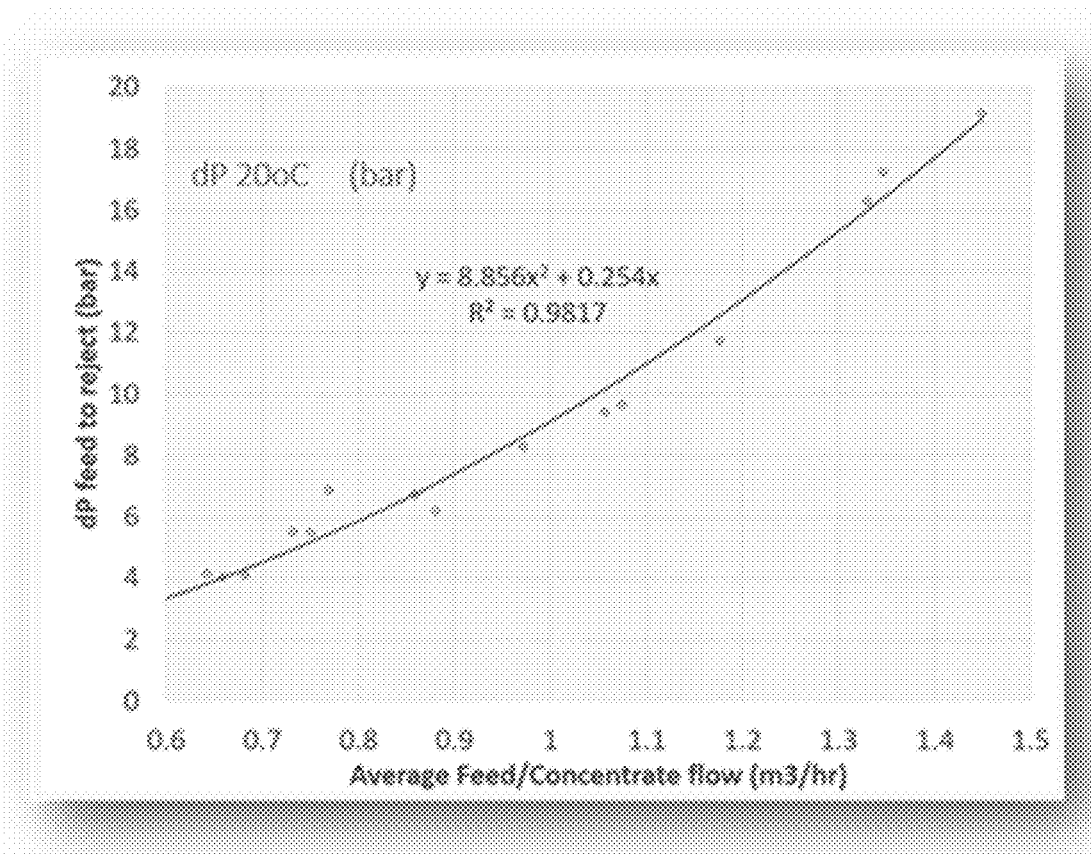
FIG. 2 is a graph of average feed/concentration flow rate verses feed side pressure drop, consistent with the present disclosure.

For example, it was determined that in one non-limiting scenario, a 0.91 mm+/−30% feed channel height H1 for the feed channel 102 can provide a target shear-flow profile, such as the shear-flow profile shown in FIG. 2.

The present disclosure further recognizes, however, that in typical operation the membrane could be damaged if the average flow of feed/reject exceeded 1.2 cubic-meters-per-hour ($m^3$/hr) or 5.3 gallons-per-minute, for example. Thus, the flow rate used during simulation and testing was limited to below 1.2 meters$^3$/hour ($m^3$/hr). In practice an additional safety factor may be applied when setting feed flow rate while obtaining target flux, e.g., a flux in the range of 10 to 40 liters/meters$^2$/hour (LMH) or at least 3 LMH, under elevated feed salinity and organic load. Simulation and testing showed typical open flow path average velocity in the channel preferably ranges from 0.2 to 2 meters per second to achieve target performance, e.g., flux between 5 and 15 LMH, recovery of >60% and permeate quality with salinity rejection typically above 98%.

For the modified spiral module, as outlined earlier, a combination of theoretical analysis and experience was used to determine the module configuration. A study by Sablani et al. tested the impact of feed channel size on permeate flow using a non-fouling simulated brine feed (deionized water plus NaCl) without consideration of impact of organics. Feed channel sizes ranged from larger than 0.51 mm but less than 1.17 mm in the tests, and a 0.71 mm feed channel produced the most permeate flow relative to other tested sizes as shown in the table 300 of FIG. 3. The recovery in that study was below 30%, which is insufficient for commercial applications. However, the present disclosure recognizes that such a configuration can provide sufficient shear at the module outlet to avoid significantly reducing permeate flow below nominal levels.

A study by Radu et al [2010] incorporated spacer type, salinity (brackish water with moderate salt levels) and biofouling into a mathematical study of a feed channel with height of 1.0 millimeter (mm). The study made strides toward a more representative feed type, albeit organic concentrations were low, such that its impact on the boundary layer could be ignored and organic concentrations were used to relate to biofouling growth mathematical modeling inside the membrane. As with the study by Sablani [2002], the recovery was low and was not a factor in the performance. Moreover, the Radu study showed the impact of spacer type over long term and short-term operation (See e.g., FIGS. 4A and 4B), and that a submerged spacer with parallel supports can improve flux due to reduced biofouling, versus other styles of spacers.

Figure 1B:
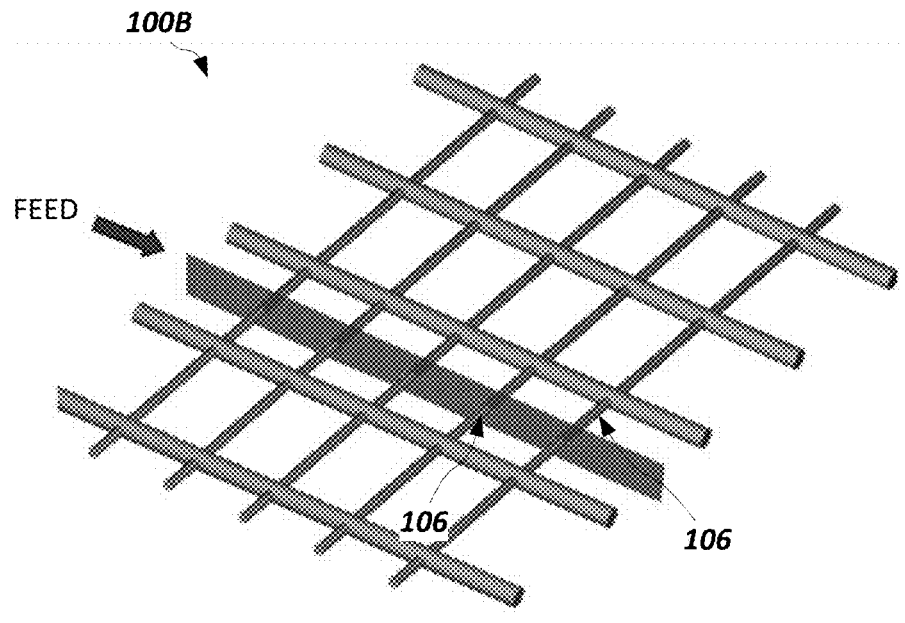
FIG. 1B shows an example ladder-like feed spacer for use within a filter membrane module consistent with the present disclosure.
Figure 1C:
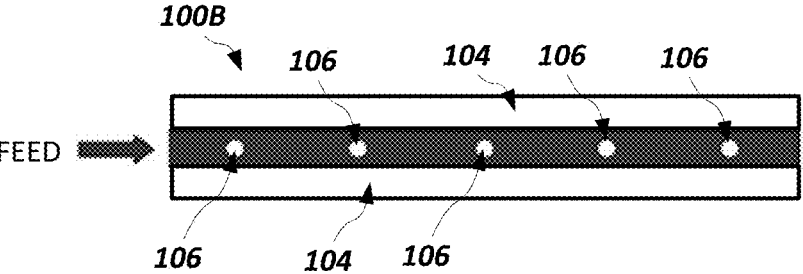
FIG. 1C shows a cross-sectional view of a ladder-like feed spacer within a filter membrane consistent with the present disclosure.
Figure 4A:
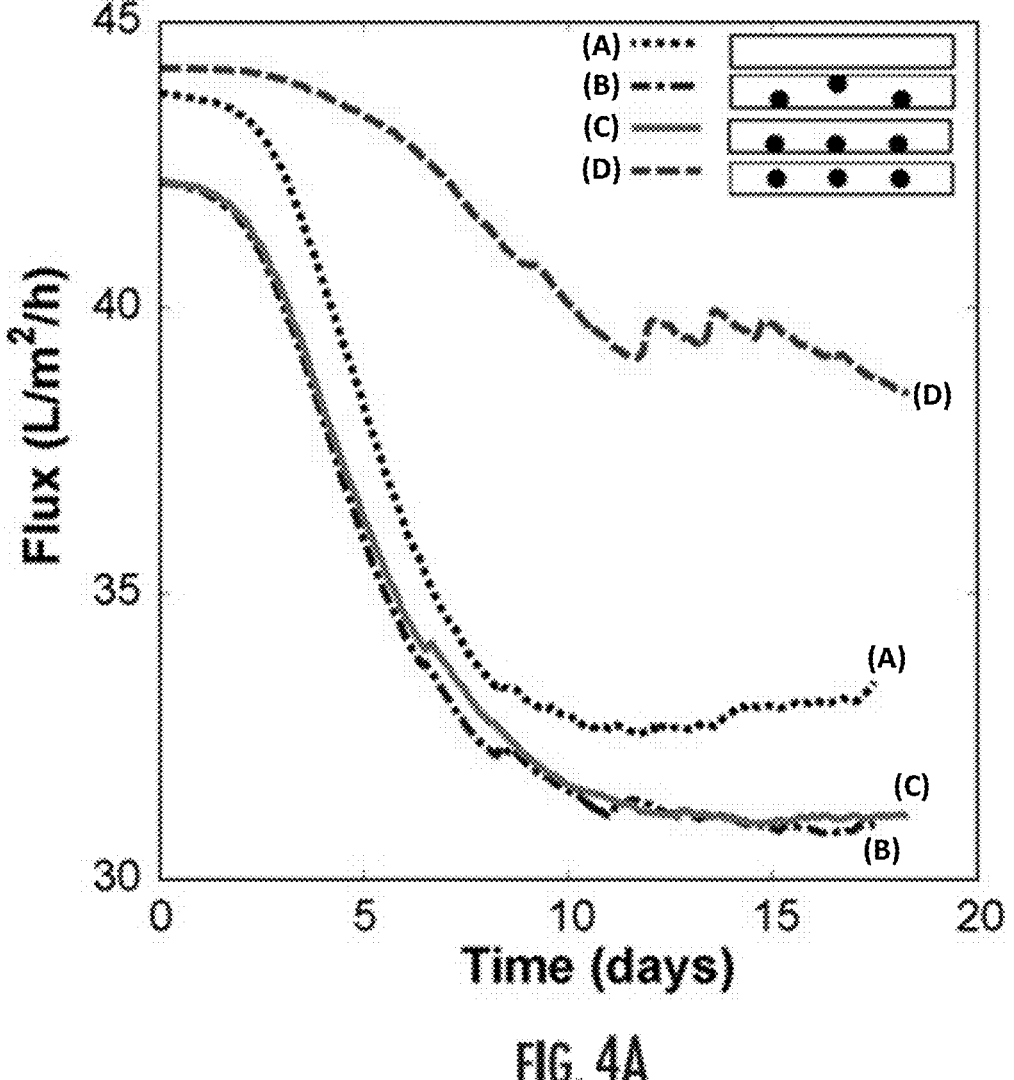
FIG. 4A is a plot of flux versus time for feed channels with different spacer configurations.
Figure 4B:
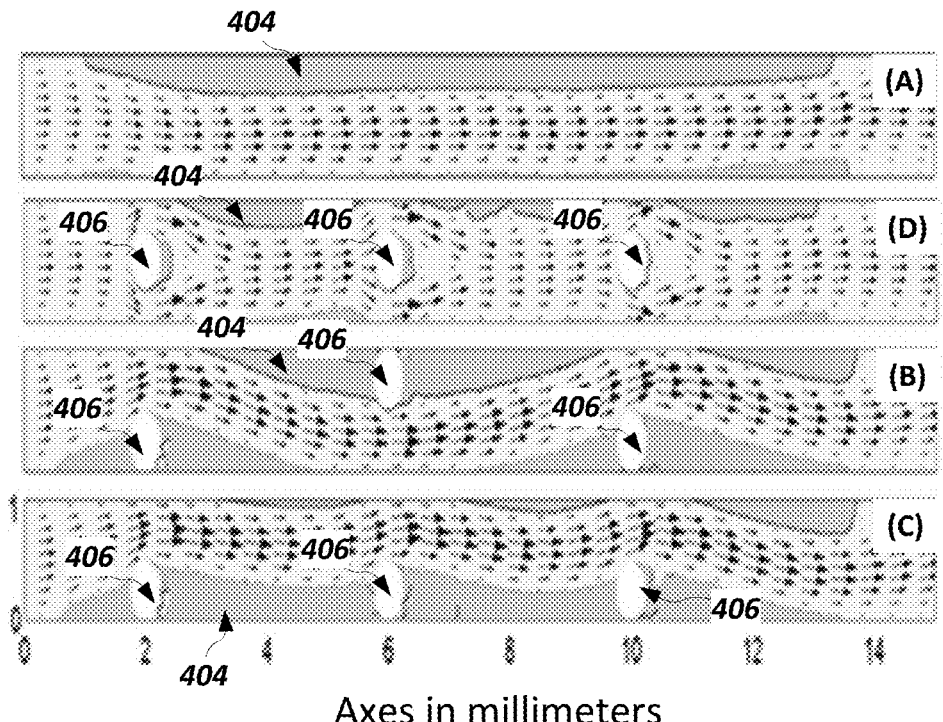
FIG. 4B is an image showing the impact of spacer geometry on feed channel flow and biofouling patterns.

More specifically, FIGS. 4A-4B shows biofilm distributions and velocity vector plots for different feed channel geometries after a time period of 15 days for: (A) a channel without spacers; (B) a channel with submerged spacers; (C) a channel, with zig zag spacers; and (D) a channel with cavity spacers (e.g., such as shown in FIGS. 1B and 1C). The boundary areas 404 represent the biofilm and the areas 406 represent the spacers. The Radu study also showed that for a feed channel with a height of 1.0 mm, operating with moderate organics, the use of a ladder-like feed spacer with centerline cross-membranes (see curve (B) in FIG. 4A and feed channel (B) of FIG. 4B) produced the highest flux both initially and over a medium operating period.

One preferred example configuration of a ladder-like feed spacer 100B is shown in FIG. 1B. As shown in FIG. 1B, feed enters the ladder-like feed spacer 100B along a path that utilizes the ladder structure of the feed spacer to enhance mass transfer in the vicinity of the membrane surface. FIG. 1C shows a cross-sectional view of the ladder-like feed spacer 100B disposed between filter membrane sections 104. As shown, the feed then encounters the spacers 106 which force the feed to flow around the ladder structures in the spacers, carrying the most dilute feed in the centerline part of the membrane feed channel, toward the membrane surface, enhancing mixing at the membrane surface by convectively transporting dilute feed to the concentrated feed location near the membrane surface, while simultaneously disrupting the concentration boundary layer with the flow disruption caused by the ladder structures. This improves mass transfer dramatically, while also allowing for reduced areas of dead spots for flow, which reduces accumulation of organic material in such dead spots that can lead to long term fouling area for the membrane.

This disclosure recognizes that a ladder-style spacer with centerline cross members with feed spacer between 0.5 mm and 1.0 mm could be used for managing organics, salinity and resulting biofouling in streams with elevated organic content. More specifically, the present disclosure recognizes that while the Sablani and Radu studies focused on low recovery, such features have been identified by the present disclosure as also being applicable in high recovery and elevated organic feed applications (e.g., greater than 100 mg/l chemical oxygen demand), particularly when the open flow path average velocity in the channel ranged from 0.05 to 0.2 meters per second.

Another aspect of the present disclosure relates to processes for reliably treating feeds with elevated organic content and/or salinity based on determining an operating feed flow for membrane modules.

In embodiments, the processes described herein can achieve acceptable/target recovery and reduced fouling rate by operating in a batch mode where the feed is converted 100% to permeate for a period of time, after which the batch concentrate is expelled, and then the process is repeated. The process may also further be repeated with 100% recovery for a second period of time. The second period of time can occur subsequent to the first period of time. During such a dynamic process, the time-averaged boundary layer concentration of organics is advantageously minimized or otherwise reduced.

Other embodiments of the present disclosure relate to processes that involve pre-concentration of organics, and simultaneous transmittance of salinity with nanofiltration or ultrafiltration. Such processes may be used to enhance the performance of a bioreactor on the reject of the nanofiltration or ultrafiltration, e.g., as discussed below with regard to FIG. 5.

Figure 5:
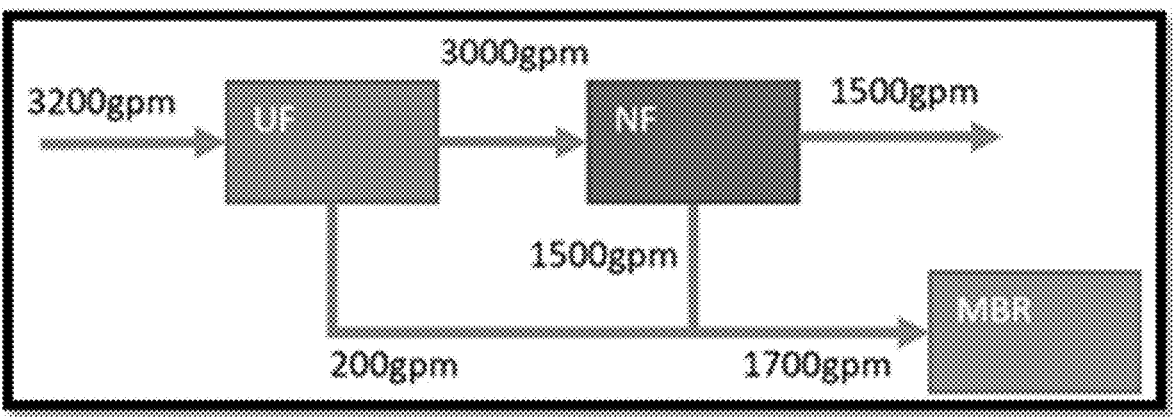
FIG. 5 is a block diagram of an example bioreactor pre-treatment process consistent with the present disclosure.

As shown in the example of FIG. 5, operation of a membrane bioreactor (MBR) may be enhanced by reducing the flow rate, thus allowing for reduced flow-related equipment with smaller size and reduce cost, reduced salinity (which is advantageous because salinity can often limit biological activity), appropriately increased organic concentration due to pre-concentration, and removal of bio-inhibiting heavy metals with appropriate membrane selection. Preferably, the reduction of flow rate is in the range of 50 to 70%, or at least 10% relative to the flow rate of the feed to the ultrafiltration (UF) and/or nanofiltration (NF). Reduced flow rate in the context of the example of FIG. 5 can be achieved based on the organics which are retained in the reject of the UF and NF. The selected recovery rate then sets the amount of concentrate/retentate formed in the UF and NF, and that in turn sets the reduction of feed volume by the UF and NF.

Other membrane selections can be incorporated into FIG. 5, such as ultrafiltration and varying nanofiltration types, but also combinations of ultrafiltration, nanofiltration and reverse osmosis, to achieve the desired organic management for the process. The example of FIG. 5 can also preferably utilize filter membranes as disclosed herein, either alone or in combination with existing filter membrane products.

Embodiments of the present disclosure are also drawn to systems and methods of water filtration, and particularly to systems and methods for filtering streams containing elevated organic content, e.g., organic content equal to or greater than 300 Pa.

Figure 6A:
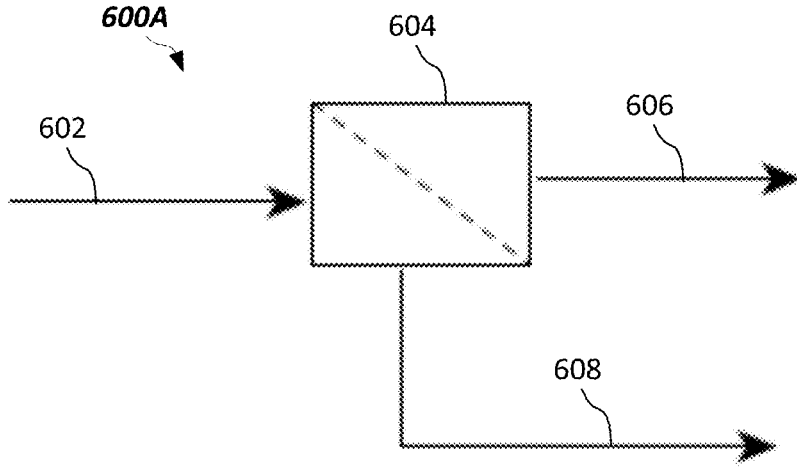
FIG. 6A shows an example operating mode for a filter system and method for treating an elevated organic feed consistent with the present disclosure.

FIG. 6A shows an example filter arrangement 600A consistent with the present disclosure. As shown, the example filter arrangement 600A preferably contains at least one filter membrane 604 consistent with the present disclosure. The at least one filter membrane 604 includes an inlet (which may also be referred to herein as a feed inlet) fluidly coupled to a feed stream 602 and an outlet (which may also be referred to herein as a permeate outlet) fluidly coupled to a permeate stream 606. The at least one filter membrane 604 further preferably fluidly couples to a retentate stream 608, which may also be referred to as a reject stream, via another outlet (which may also be referred to herein as a retentate outlet).

Figure 6B:
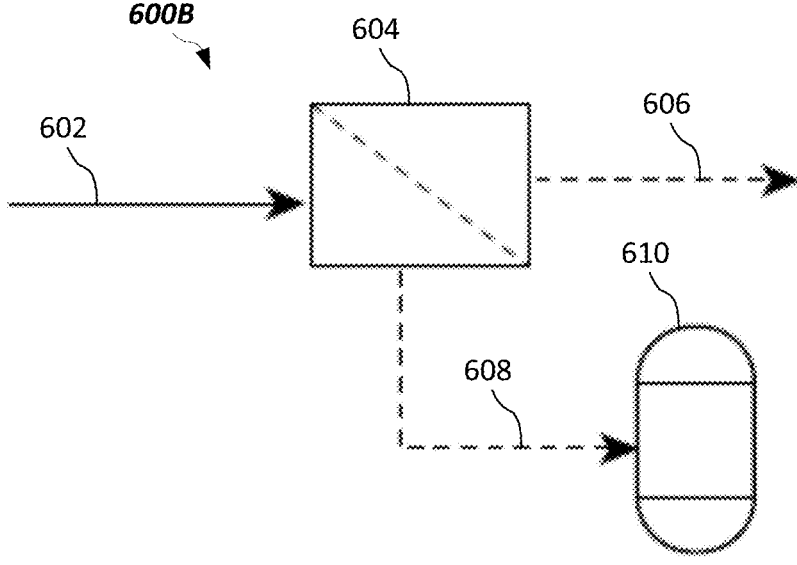
FIG. 6B shows another example operating mode for a filter system and method for treating an elevated organic feed consistent with the present disclosure.
Figures 6C, 6D, 6E:
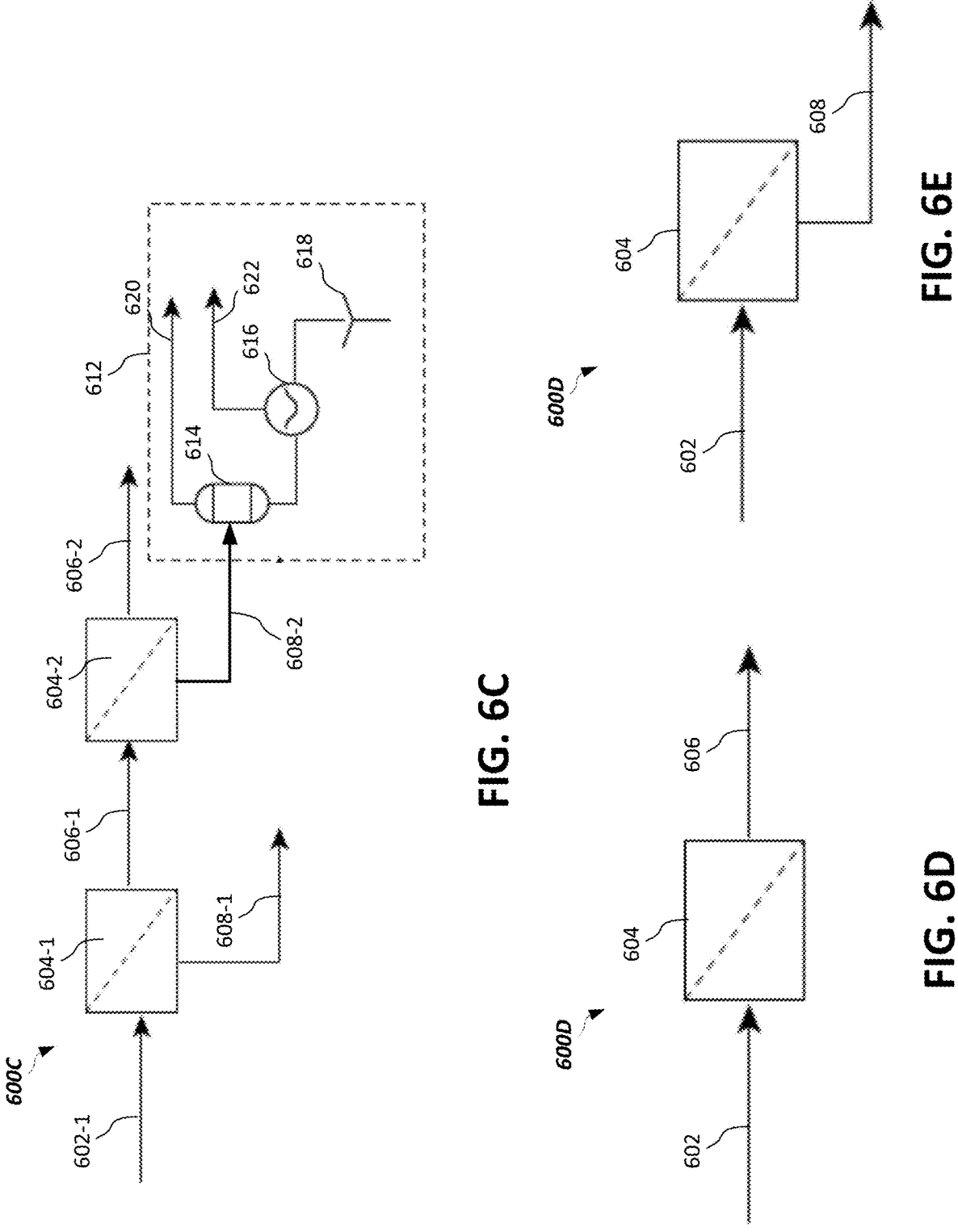
FIG. 6C shows another example operating mode for a filter system and method for treating an elevated organic feed consistent with the present disclosure.
FIG. 6D shows another example operating mode for a filter system and method for treating an elevated organic feed consistent with the present disclosure.
FIG. 6E shows another example operating mode for a filter system and method for treating an elevated organic feed consistent with the present disclosure.

Note, the following filter arrangements of FIGS. 6A-6C preferably also include at least one pump (not shown) to displace feed from the feed stream 602 into the at least one filter membrane, and more specifically, a feed channel of the at least one filter membrane 604. Preferably, the at least one pump is configured to provide variable pressure in the range of 10 bar to 120 bar for nanofiltration and 1 bar to 15 bar for ultrafiltration, or at least 0.25 bar.

The example filter arrangement 600A is preferably configured to provide treatment of feed stream 602 with organic osmotic pressure equal to a target/determined organic osmotic pressure. The target/determined organic osmotic pressure is preferably at least 300 Pa, at least 1500 Pa, or at least 3000 Pa. In this preferred example, the example filter arrangement 600A is configured to recover at least 30% of the feed stream 602 as permeate and outputs the same to the permeate stream 606, and further concentrate the feed organics for output via the retentate stream 608.

The at least one filter membrane 604 is preferably implemented as at least one plate and frame membrane module, at least one spiral membrane module with a ladder-style feed spacer, or a combination of both. In the context of plate and frame member modules, the at least one filter membrane preferably includes a feed channel height of at least 0.7 mm, and more preferably, in the range of 0.7-1.2 mm. In addition, the open channel average velocity is preferably at least 0.2 meters per second, and more preferably in the range of 0.2 and 2 meters per second to provide recovery of at least 30% of the feed stream 602 as permeate.

On the other hand, and in the context of spiral membrane modules, the at least one filter membrane 604 preferably includes a ladder-style feed spacer with channel height of at least 0.51 mm, and more preferably, in the range of 0.51 to 1.17 mm e.g. 0.8 mm±0.1 mm. In addition, the open channel average velocity for the at least one filter membrane 604 is preferably at least 0.05 meters per second, and more preferably, between 0.05 and 0.2 meters per second to recover at least 30% of the feed stream 602 as permeate. The open channel average velocity may also be referred to herein as a target open channel average velocity.

In one preferred example, the example filter arrangement 600A is configured to produce a retentate stream 608 with a target/determined organic osmotic pressure. In this preferred example, the target osmotic pressure for the retentate stream 608 is at least 300 Pa, at least 1500 Pa, or at least 3000 Pa. The at least one filter membrane 604 may be implemented as discussed above, and for this reason the description of which will not be repeated for brevity. Providing retentate with target organic osmotic pressure advantageously reduces the feed osmotic pressure by a ratio, e.g., 1 divided by 1 minus recovery rate (1/(1-recovery)).

In another preferred example, the example filter arrangement 600A is configured to separate dissolved solids from organic content.

FIG. 6B shows another example filter arrangement 600B consistent with the present disclosure. Like numerals are intended to refer to like elements between figures. As shown, the example filter arrangement 600B is substantially similar to the example filter arrangement 600A, the description of which will not be repeated for brevity.

However, the example filter arrangement 600B further preferably includes a bioreactor 610 (which may also be referred to herein as a bioreactor arrangement) fluidly coupled to the retentate stream 608 output by the at least one filter membrane 604. In this example, the retentate stream 608 includes a concentration of organics which is greater than the concentration of the organics of the feed stream 602, e.g., at least 20% greater, and the bioreactor can be used to biologically consume organic content.

FIG. 6C shows another example filter arrangement 600C consistent with the present disclosure. As shown, the example filter arrangement 600C is substantially similar to the example filter arrangement 600A, the description of which will not be repeated for brevity.

However, and as shown, the example filter arrangement 600C includes a first filter membrane 604-1 with a first permeate stream 606-1 fluidly coupled to the inlet of a second filter membrane 604-2 for additional treatment for reuse or discharge. The first and second filter membranes 604-1, 604-2 are each preferably implemented as a plate and frame membrane module consistent with the present disclosure, a spiral membrane module consistent with the present disclosure, or a combination thereof. For example, the first filter membrane 604-1 may be implemented as a plate and frame membrane module or a spiral membrane module, and the second filter membrane 604-2 may be implemented as the other of the plate and frame membrane module or the spiral membrane module.

As further shown, one or both of the first and second retentate streams 608-1, 608-2 of the first and second filter membranes 604-1, 604-2, respectively, can be fluidly coupled to a thermal water treatment arrangement 612 to allow for evaporative water treatment of typically the second stage membrane filter retentate or reject. The thermal water treatment arrangement 612 preferably comprises an evaporator 614, an optional crystallizer 616, and a final brine, slurry or solids waste handling system 618. Note, however, it is more preferable to not fluidly couple the retentate stream 608-1 to the thermal water treatment arrangement 612 because organics tend to foul such equipment and alternative treatments, such as biological treatments including a zero liquid discharge biological treatment step where the biologically treated retentate 608-1 is recycled to the feed of 604-1, may be desirable depending on the particular scenario.

An example of the process in FIG. 6C preferably uses either ultrafiltration or nanofiltration or ultrafiltration followed by nanofiltration via the first filter membrane 604-1, and reverse osmosis via the second filter membrane 604-2. The ultrafiltration and/or nanofiltration via the first filter membrane 604-1 can remove the organic content using organic removal membranes, e.g., implemented as a filter membrane modules consistent with the present disclosure, thus allowing a conventional reverse osmosis process via the second filter membrane 604-2 to be applied at least partly to concentrate the dissolved salts in stream 606-1 to produce a concentrated dissolved salts in stream 608-2, e.g., generally with up to 10 weight percent dissolved solids that is fed to the thermal process starting with the evaporator/MBR 614.

The evaporator 614 produces a solids free distillate stream 620 from the top, and concentrated brine from the bottom of evaporator 614, which can contain generally over 20 weight percent dissolved solids, and that is then preferably fed to a crystallizer 616. The crystallizer 616 produces a solids-free distillate from the top in stream 622, and typically a crystallized salt solid carried in a saturated brine stream that is preferably cooled to become a dry solid in a slurry handling system 618.

As such, in this preferred example, the raw feed from feed stream 602-1 is treated by ultrafiltration and/or nanofiltration via the first filter membrane 604-1 and its soluble organic fractions are concentrated into stream 608-1. Stream 608-1 can further be treated in a bioreactor that consumes preferably all organics and the reduced organic bioreactor effluent containing largely dissolved solids can then be recycled back into the first filter membrane 604-1 to avoid a liquid waste being produced from stream 608-1, which is akin to FIG. 6B.

The dissolved solids within stream 606-1 is then preferably further concentrated in a reverse osmosis process via the second filter membrane 604-2 and the solids free permeate within stream 606-2 is then preferably reused and optionally blended with thermal system 612 distillate streams 620 or 622, for example, for such reuse of all the water fractions. The concentrated brine from the reverse osmosis process provided via the second filter membrane 604-2 within stream 608-2, and this stream is then preferably treated thermally in thermal system 612 to isolate the dissolved solids into solid form that ultimately discharges via a stream to the solid waste handling system 618, with preferably minimal water loss to the environment. In so doing, the stream 602-1 is preferably converted to a reused organic and solids free water stream combining streams

606-2, 620 and 622, and a discharged solids stream consisting of crystallized solids in solid waste handling system 618.

It should be noted that the biological treatment of stream 608-1 can also produce biological waste solids that are generally free of water. Overall this process provides one example of a zero liquid discharge (ZLD) process as found practically in the industry and one advantageous feature introduced by the current disclosure is the enhancement of the organic removal steps involved in filtration via the first filter membrane 604-1 that allows an improved bioreactor operation on stream 608-1, and the improved operation of the downstream reverse osmosis via the second filter membrane 604-2 and thermal system 612, all of which are conventionally limited in performance by the presence of organics in stream 606-1.

Thus, the first permeate stream 606-1 may be provided to the second filter membrane 604-2 to generate concentrate therefrom. The concentrate from the first permeate stream 606-1 may then be output via the second retentate stream 608-2 to the thermal water treatment arrangement 612 for additional recovery or zero liquid discharge.

In the preferred example of FIG. 6C, the filter arrangement 600C is therefore configured to produce a retentate, e.g., via the first retentate stream 608-1 with a relatively high concentration of organics, e.g., at least 300 Pa, and a permeate stream via the second permeate stream 606-1 having a relatively low concentration of organics, e.g., equal to or less than 300 Pa.

FIG. 6D shows another example filter arrangement 600D consistent with the present disclosure. As shown, the example filter arrangement 600D preferably includes at least one filter membrane 604 consistent with the present disclosure. The at least one filter membrane 604 preferably includes an inlet fluidly coupled to the feed stream 602 to receive feed, and an outlet fluidly coupled to a permeate stream 606 to output permeate.

In one preferred example, the filter arrangement 600D provides complete conversion of feed from the feed stream 602, e.g., 100% recovery, via a batch operation/process to produce the permeate stream 606 for a predetermined period of time, at the end of which, the concentrated waste retained within the filter arrangement 600D is expelled, e.g., based on a cleaning/flush routine, as shown in FIG. 6E. In the specific, non-limiting example of FIG. 6E, the concentrated waste is expelled via retentate stream 608.

The predetermined period of time prior to expelling concentrated waste is preferably in the range of 10 minutes to 2 days, although the particular predetermined period may be application specific and the provided example is not intended to be limiting.

This batch operation and expelling of concentrated waste may then be repeated N number of times. In one preferred example, this batch operation and expelling of concentrated waste occurs only once before a regeneration or cleaning including chemical cleaning, of the membrane occurs.

In another preferred example, the at least one filter membrane 604 comprises a plurality of filter membranes fluidly coupled together in series and/or parallel to provide a multi-stage, multi-pass membrane system (e.g., permeate from one filter membrane becomes feed to another filter membrane, and/or concentrate from one filter membrane becomes the feed to another filter membrane). In this preferred example, the example filter arrangement 600D is configured to operate in a continuous operating mode. Preferably, during the continuous operating mode, the example filter arrangement 600D operates at 100% recovery for a predetermined period of time, during which the permeate stream is continuously converted to produce a permeate stream and a concentrate stream. At the end of the predetermined period of time, the concentrated waste then gets expelled via retentate stream 608 as shown in FIG. 6E. This process of FIGS. 6D and 6E may then be repeated N number of times.

Another operational example of the filter arrangement 600D is discussed in further detail in U.S. application Ser. No. 15/733,581 ('581 application) titled "Techniques for Managing Scale Formation in Reverse Osmosis (RO) and Nanofiltration (NF) systems and a hybrid filtration architecture implementing the same", the teachings of which are incorporated herein by reference in their entirety. Note, a filter membrane module consistent with the present disclosure may be utilized in a filter system/arrangement consistent with the '581 application, and preferably, in a filter system consistent with the '581 application that aims to operate with a feed stream having an organic osmotic pressure of at least 300 Pa and/or aims to provide a retentate stream with an organic osmotic pressure of at least 300 Pa.

FIGS. 7A-7H show various example filter arrangements consistent with the present disclosure.

Figures 7A, 7B:
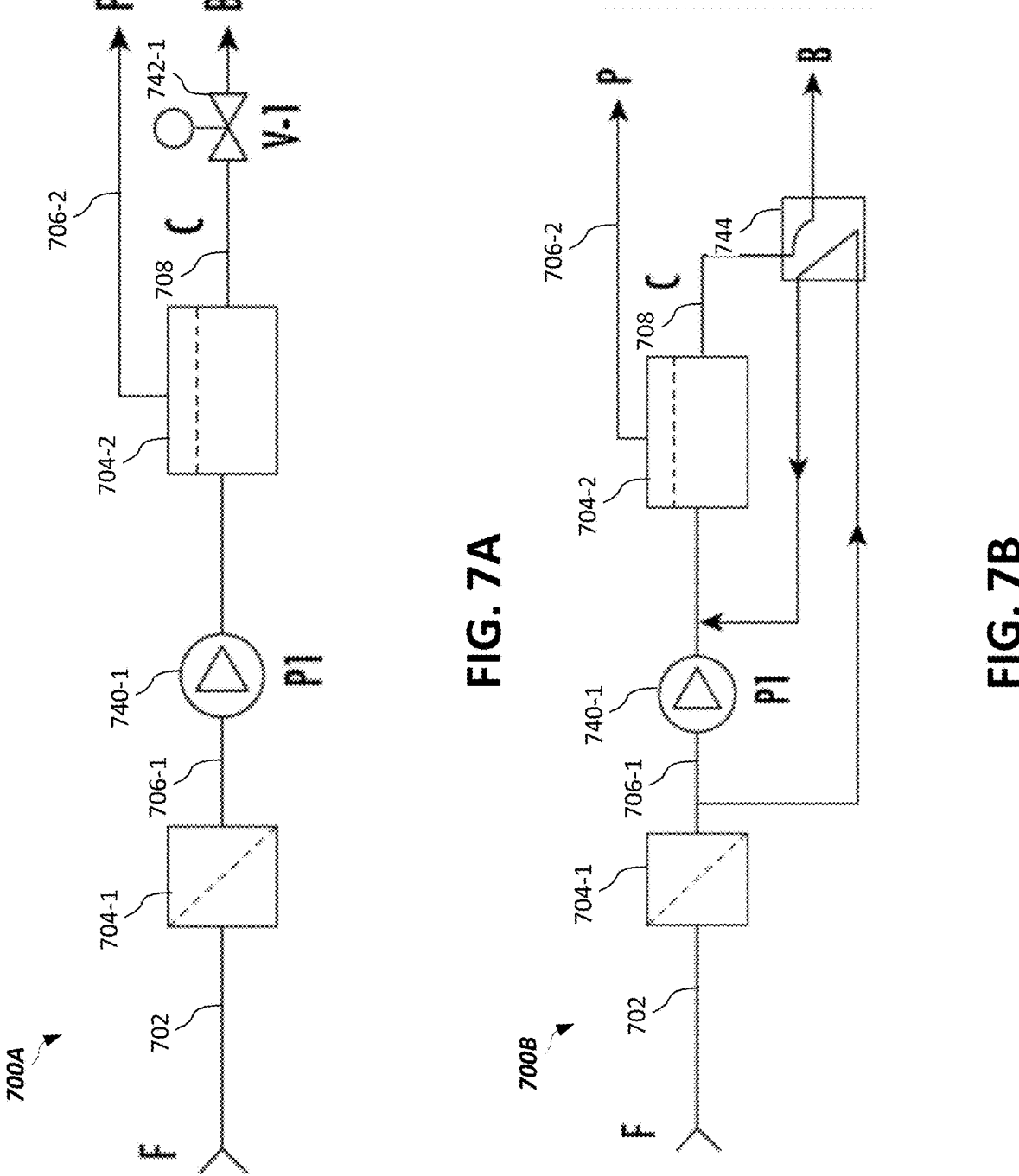
FIG. 7A shows another example operating mode for a filter system and method for treating an elevated organic feed consistent with the present disclosure.
FIG. 7B shows another example operating mode for a filter system and method for treating an elevated organic feed consistent with the present disclosure.

FIG. 7A shows one example filter configuration 700A that includes a raw feed strainer 704-1 and at least one membrane 704-2 consistent with the present disclosure, a first pump 740-1, and a first valve 742-1. Preferably, the at least one filter membrane 704-2 includes an inlet fluidly coupled to feed stream 702 to receive feed after a first pump 740-1 via a filtered feed stream 706-1.

The first pump 740-1 is preferably configured to generate pressure in the range of 5 to 120 bar, and more preferably at least 0.5 bar to cover the range of membranes from ultrafiltration through reverse osmosis. In one preferred example, the first pump 740-1 is configured to introduce a pressure sufficient to cause feed from the feed stream 702 to be displaced into the filter membrane 704-2, and more specifically a feed channel of the second filter membrane 704-2 at a target velocity of at least 0.05 meters per second.

The at least one filter membrane 704-2 is preferably configured as a nanofiltration or reverse osmosis membrane in this example configuration. The at least one filter membrane 704-2 further preferably includes an outlet coupled to a permeate stream 706-2 to output permeate (P), and also an outlet coupled to retentate stream 708 to output concentrate/retentate. The first valve 742-1 preferably fluidly couples to the retentate stream 708 and regulates output of the same to B, with B being organic-rich or a combined organic plus dissolved solids rich bleed stream, for example.

In operation, the system in FIG. 7A is a nanofiltration and reverse osmosis system, that has a raw feed strainer 704-1 that removes large particles, and a booster pump P1 shown as the first pump 740-1 that generates a pressure to produce permeate at flow rate P in the membranes of the at least one filter membrane 704-2, and where the first valve 742-1 regulates the bleed rate to control the bleed flow B and thereby manages the at least one filter membrane 704-2 water recovery in concert with the first pump 740-1, where membrane recovery=% P/Fixed Flow Rate (F). The at least one filter membrane 704-2 includes membranes consistent with this disclosure, preferably arranged such that the open channel flow velocity meets the various aims of this disclosure. The present disclosure recognizes that with a fixed feed flow rate (F), the membrane arrangements in series and parallel become limited in order to maintain the target velocity consistent with this disclosure, and this particular aspect is operationally addressed by the example of FIG. 7C discussed below.

FIG. 7B shows another example filter configuration 700B consistent with the present disclosure. The example filter configuration 700B can be configured substantially similar to that of the filter configuration 700A of FIG. 7A, the description of which will not be repeated for brevity. However, and as shown, the example filter configuration 700B further includes an energy recovery module 744. The energy recovery module 744 can comprise, for example, a pressure exchanger or turbocharger, although other types of energy recovery devices are within the scope of this disclosure.

In this preferred example, part of the filter outlet stream 706-1 is fluidly coupled to the energy recovery module 744 to recover at least a portion of the pressure energy from the stream and to reduce the pump energy needed in pump P1 to pressurize the feed. A small booster pump (not shown) can be used in the line after the pressurized stream leaves the energy recovery device 744 to make up the minor energy losses in the energy recovery device 744. The bleed stream B then preferably leaves the energy recovery device 744 with nearly all pressure (energy) removed from it.

In operation, the configuration is substantially similar to that of the example of FIG. 7A except for energy recovery to enhance the overall energy efficiency of the process.

Figures 7C, 7D:
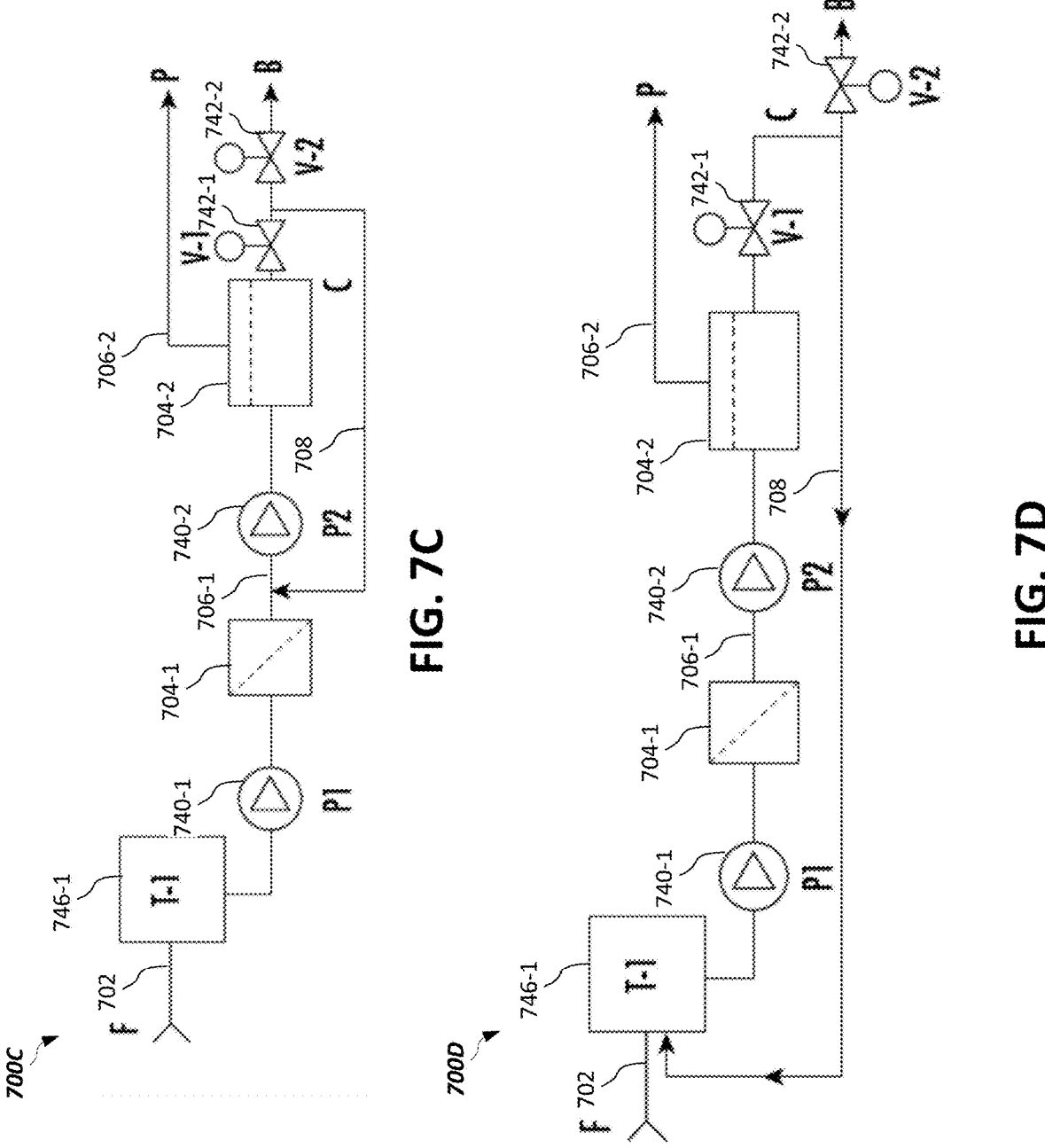
FIG. 7C shows another example operating mode for a filter system and method for treating an elevated organic feed consistent with the present disclosure.
FIG. 7D shows another example operating mode for a filter system and method for treating an elevated organic feed consistent with the present disclosure.

FIG. 7C shows another example filter configuration 700C consistent with the present disclosure. The example filter configuration 700C can be configured substantially similar to that of the filter configuration 700A of FIG. 7A, the description of which will not be repeated for brevity.

However, and as shown, the example filter configuration 700C further preferably includes a first tank 746-1 fluidly coupled between the feed stream 702 and the inlet of the raw feed strainer 704-1 (which can alternatively be placed upstream on line 702 such as prior to the first feed tank 746-1). In addition, the first pump 740-1 can provide a feed pump to displace feed into the feed filter or raw feed strainer 704-1 from the first feed tank 746-1.

In operation, the system is similar to FIG. 7A except that it allows for circulation of a portion of the bleed from the outlet end to the at least one filter membrane 704-2, thereby allowing a more flexible and larger membrane array to be applied in the at least one filter membrane 704-2 while still maintaining the minimum velocity through the at least one membrane 704-2 regardless of feed flow rate F, by instead managing the amount of circulation flow that is added to the second pump 740-2.

FIG. 7D shows another example filter configuration 700D consistent with the present disclosure. The example filter configuration 700D can be configured substantially similar to that of the filter configurations 700A and 700C of FIGS. 7A and 7C, respectively, the description of which will not be repeated for brevity.

However, as shown, the example filter configuration 700D further preferably includes the first feed tank 746-1 with an inlet also fluidly coupled to the retentate stream 708. The first valve 742-1 may then selectively fluidly couple the retentate stream 708 to the first feed tank 746-1. The second valve 742-2 may be used to selectively fluidly couple the retentate stream 708 to B, with B being a flush or bleed stream. The second valve 742-2 and stream B can be moved to other locations on retentate stream 708, such as near the inlet of stream 708 to first feed tank 746-1, so as to enhance flushing of line 708 for example.

In operation, the example filter configuration 700D is preferably configured for batch mode and has the ability to operate in batch mode with 100% recovery with the second valve 742-2 closed or as a partial batch with a bleed flow rate with the second valve 742-2 partially open. The system receives feed F from stream 702 into the first feed tank 746-1 and produces permeate P and bleed B for a period of time with the concentration of retained materials building up/ever-increasing over this period of time inside the system including the first feed tank 746-1. At a predefined trigger point, the system stops production by opening the first and second valves 742-1, 742-2 fully and uses the first pump 740-1 to empty the first feed tank 746-1 and then uses feed F to flush the entire system to remove preferably all concentrated contaminants from the system, and then reverts back to production, repeating the process unless membrane cleaning or regeneration is desired.

Figures 7E, 7F:
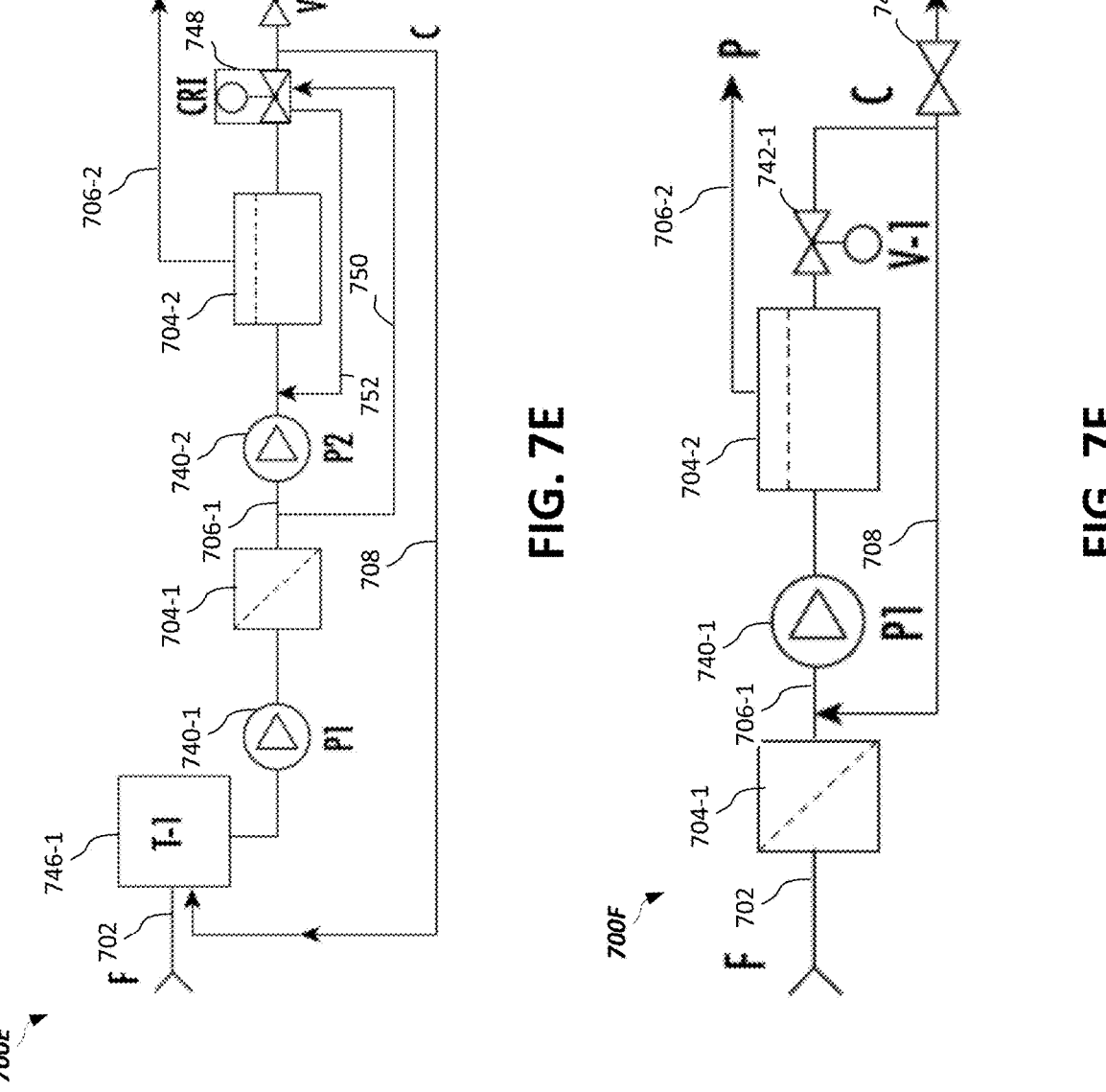
FIG. 7E shows another example operating mode for a filter system and method for treating an elevated organic feed consistent with the present disclosure.
FIG. 7F shows another example operating mode for a filter system and method for treating an elevated organic feed consistent with the present disclosure.

FIG. 7E shows another example filter configuration 700E consistent with the present disclosure. The example filter configuration 700E can be configured substantially similar to that of the filter configuration 700D, the description of which will not be repeated for brevity.

However, as shown, the example filter configuration 700E further preferably includes the retentate stream 708 preferably fluidly coupled to energy recovery device 748. The energy recovery device 748 further preferably comprises a turbocharger or pressure exchanger, although other types of energy recovery devices are within the scope of this disclosure. The energy recovery device 748 further preferably includes an inlet fluidly coupled to the retentate outlet of the at least one filter membrane 704-2. In addition, the energy recovery device 748 further fluidly couples between the raw feed strainer 704-1 and the second pump 740-2 via stream/line 750. In addition, the energy recovery device 748 further fluidly couples between the second pump 740-2 and the at least one filter membrane 704-2 via return line/stream 752.

In operation, the example filter configuration 700E is preferably configured for batch mode and operates similarly to the process described above with regard to FIG. 7D except that the energy from the membrane reject stream (e.g., flow rate is flow of streams B plus stream 708) is recovered and transferred into stream 750, so as to reduce the boost pressure of the second pump 740-2. A small booster pump (not shown) may also be added to stream 752 to overcome small losses in the energy recovery process. As such, FIG. 7E can be relatively more energy efficient than that of the example configuration of FIG. 7D, if the first feed tank 746-1 were an atmospheric pressure tank.

FIG. 7F shows another example filter configuration 700F consistent with the present disclosure. The example filter configuration 700F can be configured substantially similar to that of the filter configuration 700C, the description of which will not be repeated for brevity.

However, as shown, the example filter configuration 700F does not show the first feed tank 746-1 and second pump 740-2 (e.g., a feed pump) as shown in 700C.

In operation, the example filter configuration 700F is preferably configured for batch mode and unlike 700D, 700F does not necessarily use a tank for the batch cycle, but otherwise operates similarly. As a result the example 700F can maintain the system volume under pressure unlike 700D where the first feed tank 746-1 could be an atmospheric tank, and as such example 700F can be relatively more energy efficient system than 700D without the need for energy recovery as used in example 700E.

Figures 7G, 7H:
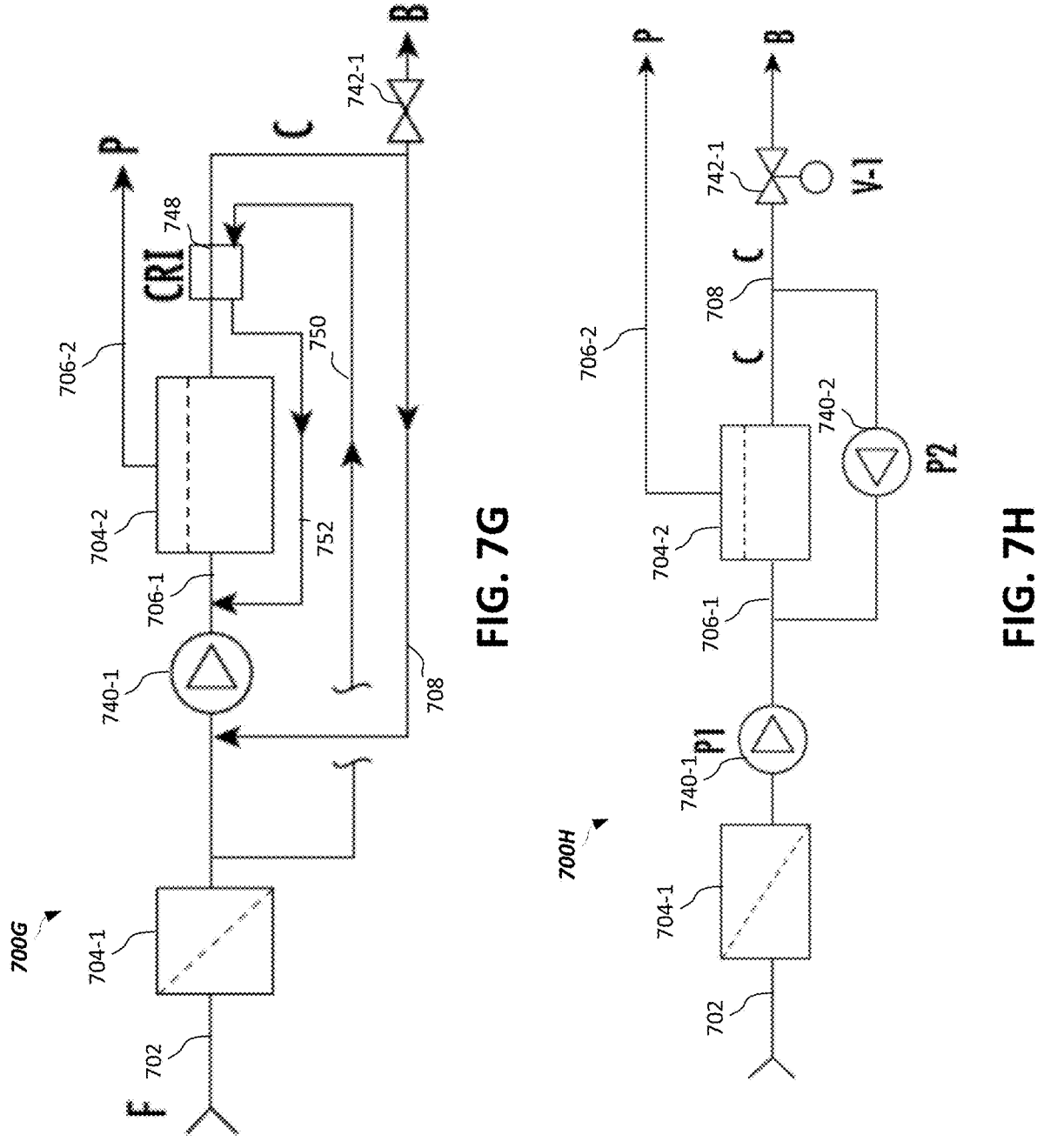
FIG. 7G shows another example operating mode for a filter system and method for treating an elevated organic feed consistent with the present disclosure.
FIG. 7H shows another example operating mode for a filter system and method for treating an elevated organic feed consistent with the present disclosure.

FIG. 7G shows another example filter configuration 700G consistent with the present disclosure. The example filter configuration 700G can be configured substantially similar to that of the filter configuration 700E, the description of which will not be repeated for brevity.

However, as shown, the example filter configuration 700G further preferably includes a retentate outlet of the at least one filter membrane 704-2 fluidly coupled to the energy recovery device 748.

In operation, the example filter configuration 700G is preferably configured for batch mode and operates similarly to 700F except that 700G reduces the pressure of the concentrate stream C and captures this energy and transfer it to stream 750 for energy efficiency, at the same time reducing the pressure of concentrate C to enable use of lower cost low pressure piping for the piping volume in the concentrate recycle line.

FIG. 7H shows another example filter configuration 700H consistent with the present disclosure. The example filter configuration 700H can be configured substantially similar to that of the filter configuration 700F, the description of which will not be repeated for brevity.

However, as shown, the example filter configuration 700H further preferably includes the second pump 742-2 operating as a recirculation pump. Note, the example filter configurations 700D-700G may also include this recirculation configuration with minor modification.

In operation, the example filter configuration 700H is preferably configured for batch mode and operates similarly to 700F but instead of making up the pressure loss along the at least one filter membrane 704-2 using the first pump 740-1, this pressure loss in the circulation flow is instead made up by the second pump 740-2 operating as circulation pump P2. The use of a circulation pump has potential for enhanced efficiency as the pressure into the first pump 740-1 may vary and benefit from pressure throttling of the circulation pressure in the configuration of 700F, which wastes energy relative to the example 700H.

In accordance with an aspect, a method of operating a filter arrangement/system is disclosed. Preferably, the method is performed whole, or at least in part, using any one of the example filter configurations discussed above with regard to FIGS. 7D-7G, and optionally any one of such filter arrangements with the recirculation configuration shown in FIG. 7H.

The method preferably includes at least partially opening the first valve 742-1, and more preferably, fully opening the first valve 742-1. The method then preferably includes energizing the first pump 740-1 and providing a driving signal thereto to introduce a predetermined amount of pressure and resulting concentrate velocity. The driving signal can be provided by, for example, a filter controller (not shown) implemented as a programmable logic device, processor, or other suitable circuit. In one preferred example, the predetermined amount of pressure is at least 0.5 bar, or more preferably, at least 1 bar±10% to introduce a proportional target membrane velocity in the range of 0.05 to 2 meters/second.

The method further includes adjusting the first valve 742-1 based on the predetermined pressure to produce a target flow of permeate, and also to preferably maintain concentrate flow rate at a desired flow rate target. The first valve 742-1 may be adjusted manually, via a user-supplied force, or via a signal provided by a filter controller. One such example target flow of permeate includes an average flow in range of 100 to 200 gpm of permeate, and one example target concentrate flow rate includes an average flow in the range of 20 to 40 gpm. Optionally, the flow rate and concentrate rates may be adjusted to different targets over time depending on a desired application.

The method further includes setting the target feed flow rate F substantially equal to the permeate flow rate P, preferably within ±5%, and more preferably within ±2% when averaged over time. Operation then continues in this substantially equal flow rate mode for a predetermined amount of time. One example predetermined amount of time to operate in this mode is at least 10 minutes. At the end of the predetermined amount of time, the method further includes actuating the first valve 742-1, e.g., manually or via a remote signal from a filter controller, to stop the flow/production of permeate. The method may then preferably include using feed or another water source to flush the system, e.g., via opening the second valve 742-2 either manually or via a signal provided by a filter controller. The method may then be repeated N number of times depending on a desired application.

Additional example methodology and architecture for operating a filter arrangement/system consistent with the present disclosure is disclosed. The following preferably includes providing a feed stream as input to a filter arrangement/system consistent with any one of the example arrangements shown in FIGS. 7A-7H.

One preferred method includes causing the first and second pumps 740-1 and 740-2 to create a pressure difference and move/displace the feed via the feed stream 702 the at least one filter membrane 704-2 preferably implemented to a filtration module, such as an RO membrane module, ultrafiltration module, nanofiltration module, or the like, or any other membrane module consistent with the present disclosure. Preferably, the at least one filter membrane module 704-2 is implemented as a frame module or a spiral module consistent with the present disclosure, and the feed of the feed stream 702 has an organic osmotic pressure greater than or equal to 300 Pa, 1500 Pa, or even 3000 Pa.

Note, the portion of the feed passing through the filtration module is termed for reference and illustrated as permeate (P), and the portion of the feed rejected by the module is termed concentrate and is referenced and illustrated as concentrate (C). The flow of concentrate (C) or permeate (P) is controlled preferably by the first valve 742-1 implemented as a throttle valve.

Preferably, the method includes closing the second valve 742-2 for a predetermined amount of time during operation to cause the feed flow rate to be substantially equal to the permeate flow rate, e.g., within ±5%, or more preferably within ±2% when averaged over time. At that time (e.g., when the second valve 742-2 is closed), the first valve 742-1 is preferably opened to reduce or stop the flow of permeate, and feed may then be recirculated for filtration while and water is recirculated for filtration. At a later point, and preferably prior to induction (e.g., prior to scaling/fouling or the conditions giving rise to such scaling/fouling being at or above a target threshold), the second valve 742-2 may then be opened and the system/arrangement may then be flushed with feed and/or with any other water source.

Another example method is disclosed for treatment of a feed stream to provide at least 30% of the feed stream as permeate. The method preferably comprises determining an organic osmotic pressure for a feed stream or a retentate stream, the organic osmotic pressure being at least 300 Pascal (Pa), selecting at least one filter membrane based on the determined organic osmotic pressure, the at least one selected filter membrane having a feed channel height of at least 0.5 mm, and selecting an open channel average velocity for the at least one selected filter membrane of at least 0.05 meters per second. The selected filter membrane may then be operated in a system that preferably features batch RO, e.g., 100% recovery, or in other filtration systems such as those that also feature energy recovery, substantially continuous filter operation (e.g., recovery at a rate less than or equal to a maximum non-scaling/fouling recovery rate for a filter membrane), feed recirculation loops, and/or feed tanks.

Example 1: Reverse Osmosis Trial

Figure 8:
FIG. 8 shows one example of a benchtop Crosstek Aquazoom™ Disc Tube Reverse Osmosis (DTRO) system consistent with the present disclosure.

A concentration trial was performed with the benchtop Crosstek Aquazoom™ DTRO system 800 shown in FIG. 8. The system includes a feed tank 804 with a chiller system including chiller 820 and chiller pump 822, feed line 808, a feed pump 802, a circulation pump 826, a prefilter 816, a membrane module 818, and associated flow indicator 806, pressure indicator 824, and temperature indicator 810. The membrane module 818 further includes a feed inlet coupled to feed line 808, a permeate outlet 814, and a concentrate outlet 812.

The test was performed using a seawater polyamide reverse osmosis membrane with 10 ft$^2$ of membrane filtration area within the membrane module 818. The membrane module 818 used during the test was a tighter and higher rejection membrane for elevated feed level salinity, e.g., specification of this membrane is that it would generally remove over 99% of all dissolved solids including sodium chloride—meaning that of 100% dissolved solids in the membrane feed, over 99% would be removed and retained in the membrane concentrate. Note, membrane modules with lower rejection may also be used and the provided example is not intended to be limiting.

During the trial ultrafiltration (UF) permeate was fed to the DTRO pilot system 800. The UF permeate was concentrated over time by removing permeate from the feed sample. The test was conducted in three steps with a feed and permeate sample collected at the end of each of the steps. The steps were 1× concentration, 1× to 5× concentration and 5× to 10× concentration (90% water recovery), while measuring permeate flow.

Biochemical oxygen demand (BOD) was measured in the feed and each concentrate. The pressure needed to overcome the osmotic pressure of the inorganic salts in bulk solution (e.g., salinity) was estimated in each concentrate based on the feed total dissolved solids of 2,000 mg/L. The pressure needed to drive the water through the membrane was estimated based on the permeance properties of the membrane and the flux of permeate through the membrane at each concentration. The pressure needed to overcome the osmotic pressure of the organics in solution (e.g., BOD) was estimated as the difference; the salt osmotic pressure and pressure to drive permeance was subtracted from the feed driving pressure of 60 bar. As the inorganic salts and soluble organics are concentrated at the membrane surface during the trial, the actual osmotic pressure that needs to be overcome is actually higher than any estimate based on the bulk solution concentration. Even at a higher osmotic pressure for salinity at the membrane surface, the osmotic pressure of the soluble organics is a significant percentage of the feed pressure required to treat the wastewater with a reverse osmosis membrane. Biochemical oxygen demand (BOD), pressure-salinity, pressure-membrane permeance, and pressure-organics were measured at 60 bar/870 psid transmembrane pressure, and are reported in Table 1 below. As the organic concentration increased, the contribution of organics to the osmotic pressure surpassed that from the membrane permeance and became the highest contributor to the membrane pressure requirement for the filtration. In Table 1, volumetric concentration factor (VCF) equals total feed volume divided by concentrate remaining.

TABLE 1

| Analytical data for the high pressure reverse osmosis test | | | | |
| --- | --- | --- | --- | --- |
| BOD [mg/l] | | Pressure Salinity | Pressure-Membrane Permeance | Pressure-Organics |
| VCF | Feed | bar | bar | Bar |
| 1 | 1570 | 1.4 | 53.6 | 5.0 |
| 5 | 5240 | 3.4 | 28.6 | 28.0 |
| 10 | 10700 | 10.1 | 17.9 | 32.0 |

The following example aspects of the present disclosure are preferably implemented using a filter configuration consistent with the present disclosure, and more preferably, a filter configuration as shown in FIG. 6A.

One such example aspect of the present disclosure includes a system or method for treatment of feed stream with Organic osmotic pressure >300 Pa using a membrane to recover more than 30% of the feed as permeate and concentrate the feed organics.

Another such example aspect of the present disclosure includes a system or method for treatment of feed stream with Organic osmotic pressure >300 Pa using a plate and frame membrane module with feed channel height between 0.7 and 1.2 mm and an open channel average velocity between 0.2 and 2 meters per second, to recover greater than or equal to 30% of the feed as permeate and concentrate the feed organics.

Another such example aspect of the present disclosure includes a system or method for treatment of feed stream with Organic osmotic pressure >300 Pa using a spiral membrane module with a ladder-style feed spacer with channel height between 0.51 and 1.17 mm (e.g., 0.8 mm) and an open channel average velocity between 0.05 and 0.2 meters per second, to recover greater than or equal to 30% of the feed as permeate and concentrate the feed organics.

Another such example aspect of the present disclosure includes a system or method for treatment of feed stream with Organic osmotic pressure >1500 Pa using a plate and frame membrane module with feed channel height between 0.7 and 1.2 mm and an open channel average velocity between 0.2 and 2 meters per second, to recover greater than or equal to 30% of the feed as permeate and concentrate the feed organics.

Another such example aspect of the present disclosure includes a system or method for treatment of feed stream with Organic osmotic pressure >1500 Pa using a spiral membrane module with a ladder-style feed spacer with channel height between 0.51 and 1.17 mm (e.g., 0.8 mm) and an open channel average velocity between 0.05 and 0.2 meters per second, to recover greater than or equal to 30% of the feed as permeate and concentrate the feed organics.

Another such example aspect of the present disclosure includes a system or method for treatment of feed stream with Organic osmotic pressure >3,000 Pa using a plate and frame membrane module with feed channel height between 0.7 and 1.2 mm and an open channel average velocity between 0.2 and 2 meters per second, to recover greater than or equal to 30% of the feed as permeate and concentrate the feed organics.

Another such example aspect of the present disclosure includes a system or method for treatment of feed stream with Organic osmotic pressure >3,000 Pa using a spiral membrane module with a ladder-style feed spacer with channel height between 0.51 and 1.17 mm (e.g., 0.8 mm) and an open channel average velocity between 0.05 and 0.2 meters per second, to recover more greater than or equal to 30% of the feed as permeate and concentrate the feed organics.

Another such example aspect of the present disclosure includes a system or method for treatment of feed stream to produce a retentate with Organic osmotic pressure >300 Pa using a plate and frame membrane module with feed channel height between 0.7 and 1.2 mm and an open channel average velocity between 0.2 and 2 meters per second.

Another such example aspect of the present disclosure includes a system or method for treatment of feed stream to produce a retentate with Organic osmotic pressure >300 Pa using a spiral membrane module with a ladder-style feed spacer with channel height between 0.51 and 1.17 mm (e.g., 0.8 mm) and an open channel average velocity between 0.05 and 0.2 meters per second.

Another such example aspect of the present disclosure includes a system or method for treatment of feed stream to produce a retentate with Organic osmotic pressure >1500 Pa using a plate and frame membrane module with feed channel height between 0.7 and 1.2 mm and an open channel average velocity between 0.2 and 2 meters per second.

Another such example aspect of the present disclosure includes a system or method for treatment of feed stream to produce a retentate with Organic osmotic pressure >1500 Pa using a spiral membrane module with a ladder-style feed spacer with channel height between 0.51 and 1.17 mm (e.g. 0.8 mm) and an open channel average velocity between 0.05 and 0.2 meters per second.

Another such example aspect of the present disclosure includes a system or method for treatment of feed stream to produce a retentate with Organic osmotic pressure >3,000 Pa using a plate and frame membrane module with feed channel height between 0.7 and 1.2 mm and an open channel average velocity between 0.2 and 2 meters per second.

Another such example aspect of the present disclosure includes a system or method for treatment of feed stream to produce a retentate with Organic osmotic pressure >3,000 Pa using a spiral membrane module with a ladder-style feed spacer with channel height between 0.51 and 1.17 mm (e.g., 0.8 mm) and an open channel average velocity between 0.05 and 0.2 meters per second.

Another such example aspect of the present disclosure includes a system or method for treatment of feed stream with Organic osmotic pressure >300 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream with Organic osmotic pressure >300 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

Another such example aspect of the present disclosure includes a system or method for treatment of feed stream with Organic osmotic pressure >1500 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream with Organic osmotic pressure >1500 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

Another such example aspect of the present disclosure includes a system or method for treatment of feed stream with Organic osmotic pressure >3,000 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream with Organic osmotic pressure >3,000 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

Another such example aspect of the present disclosure includes a system or method for treatment of feed stream to produce a retentate with Organic osmotic pressure >300 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream to produce a retentate with Organic osmotic pressure >300 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

Another such example aspect of the present disclosure includes a system or method for treatment of feed stream to produce a retentate with Organic osmotic pressure >1500 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream to produce a retentate with Organic osmotic pressure >1500 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

Another such example aspect of the present disclosure includes a system or method for treatment of feed stream to produce a retentate with Organic osmotic pressure >3,000 Pa using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream to produce a retentate with Organic osmotic pressure >3,000 Pa using a spiral membrane module with a ladder-style feed spacer with channel height between 0.51 and 1.17 mm (e.g., 0.8 mm) and an open channel average velocity between 0.05 and 0.2 meters per second, to separate dissolved solids from organic content.

The following example aspects of the present disclosure are preferably implemented using a filter configuration consistent with the present disclosure, and more preferably, a filter configuration as shown in FIG. 6B. Preferably, the following cases are for concentrating organics for bioreactor treatment, and further preferably with optional feed and/or organics limits.

One such example aspect of the present disclosure includes a system or method for treatment of feed stream to produce a retentate which is more concentrated in organics and that is directed to a bioreactor using a plate and frame membrane module with feed channel height between 0.7 and 1.2 mm and an open channel average velocity between 0.2 and 2 meters per second, to separate dissolved solids from organic content.

Another such example aspect of the present disclosure includes a system or method for treatment of feed stream to produce a retentate which is more concentrated in organics, the retentate directed to a bioreactor using a spiral membrane module with a ladder-style feed spacer with channel height between 0.51 and 1.17 mm and typically 0.8 mm and an open channel average velocity between 0.05 and 0.2 meters per second, to separate dissolved solids from organic content.

The following example aspects of the present disclosure are preferably implemented using a filter configuration consistent with the present disclosure, and more preferably, a filter configuration as shown in FIG. 6C. Preferably, the following cases are directed to concentrating organics and further polishing of reduced organics stream, and optionally with feed and/or organics limits.

One such example aspect of the present disclosure includes a system or method for treatment of feed stream to produce a retentate with a relatively high concentration of organics and a permeate stream with a relatively low concentration of organics, using a plate and frame membrane module with feed channel height between 0.7 and 1.2 mm and an open channel average velocity between 0.2 and 2 meters per second, to separate dissolved solids from organic content. The permeate stream is sent to a second membrane for additional treatment for reuse or discharge.

Another such example aspect of the present disclosure includes a system or method for treatment of feed stream to produce a retentate with a relatively high concentration of organics and a permeate stream with a relatively low concentration of organics, using a spiral membrane module with a ladder-style feed spacer with channel height between 0.51 and 1.17 mm and typically 0.8 mm and an open channel average velocity between 0.05 and 0.2 meters per second, to separate dissolved solids from organic content. The permeate stream is sent to a second membrane for additional treatment for reuse or discharge.

In the prior example, the example aspect may also further include wherein a concentrate is formed from the permeate stream using the second membrane, and the concentrate is subject to thermal treatment for additional recovery or zero liquid discharge.

The following example aspects of the present disclosure are preferably implemented using a filter configuration consistent with the present disclosure, and more preferably, a filter configuration as shown in FIG. 6D. Preferably, the following cases are directed to batch operation to manage organic concentrations in boundary layer.

One such example aspect of the present disclosure includes a system or method for complete conversion of a feed stream to produce a permeate stream by a membrane system for a period of time after which the concentrated waste retained in the system is expelled, and the process is repeated.

Another such example aspect of the present disclosure includes a system or method for complete conversion of a feed stream to produce a permeate stream by a membrane system for a period of time after which the concentrated waste retained in the system is expelled, and the process is repeated one time before regeneration of the membrane.

Another such example aspect of the present disclosure includes a system or method for complete conversion of a feed stream to produce a permeate stream by a multi-stage and multi-pass membrane system configured to operate in a continuous operating mode, during which the feed stream is continuously converted to a concentrate stream and a permeate stream continuously, and the system and method is configured such that the membrane system complete converts of the feed stream to produce a permeate stream for a period of time, after which concentrated waste retained in the system is expelled, and the process is repeated.

Another such example aspect of the present disclosure includes a system or method for complete conversion of a feed stream to produce a permeate stream by a membrane system for a period of time, after which the concentrated waste retained in the system is expelled and the process is repeated, using a plate and frame membrane module with feed channel height between 0.7 and 1.2 mm and an open channel average velocity between 0.2 and 2 meters per second.

Another such example aspect of the present disclosure includes a system or method for complete conversion of a feed stream to produce a permeate stream by a membrane system for a period of time after which the concentrated waste retained in the system is expelled, and the process is repeated, using a spiral membrane module with a ladder-style feed spacer with channel height between 0.51 and 1.17 mm and typically 0.8 mm and an open channel average velocity between 0.05 and 0.2 meters per second.

Additional Example Methodologies and Architecture

The following examples pertain to further aspects of the present disclosure, from which numerous permutations and configurations of the foregoing systems and methods will be illustrated.

Example 1 of the present disclosure is a method for treatment of a feed stream to provide at least 30% of the feed stream as permeate. The method comprising determining an organic osmotic pressure for a feed stream or a retentate stream, the organic osmotic pressure being at least 300 Pascal (Pa), selecting at least one filter membrane based on the determined organic osmotic pressure, the at least one selected filter membrane having a feed channel height of at least 0.5 mm, and selecting an open channel average velocity for the at least one selected filter membrane of at least 0.05 meters per second.

Example 2 includes the features of Example 1, wherein selecting the at least one filter membrane comprises selecting a plate and frame membrane module and/or a spiral membrane module with a ladder-style feed spacer.

Example 3 includes the features of any one of Examples 1-2, wherein selecting the at least one filter membrane further comprises selecting a membrane module configured to withstand internal pressures of at least 2 bar.

Example 4 includes the features of any one of Examples 1-3, wherein selecting the at least one filter membrane further comprises selecting a plate and frame membrane module having a feed channel height in a range of 0.7 to 1.2 mm, and/or a spiral membrane with a ladder-style feed spacer with a feed channel height in a range of 0.51 to 1.17 mm.

Example 5 includes the features of any one of Examples 1-4, wherein selecting the open channel average velocity for the at least one selected filter membrane further comprises selecting an open channel average velocity in a range of 0.2 to 2.0 meters per second, or selecting an open channel average velocity in a range of 0.05 to 0.2 meters per second.

Example 6 includes the features of any one of Examples 1-2, wherein the determined organic osmotic pressure is at least 1500 Pa, and wherein the selecting the at least one filter membrane comprises selecting a plate and frame membrane module with a feed channel height in a range of 0.7 to 1.2 mm, and wherein selecting the open channel average velocity further comprises selecting an open channel average velocity in a range of 0.2 to 2 meters per second.

Example 7 includes the features of Example 6, wherein the determined organic osmotic pressure is at least 3000 Pa.

Example 8 includes the features of any one of Examples 1-2, wherein the determined organic osmotic pressure is at least 1500 Pa, and wherein the selecting the at least one filter membrane comprises selecting a spiral membrane module with a ladder-style feed spacer with channel height in a range of 0.51 to 1.17 mm.

Example 9 includes the features of Example 8, wherein selecting the open channel average velocity further comprises selecting an open channel average velocity in a range of 0.05 to 0.2 meters per second.

Example 10 includes the features of Example 9, wherein the determined organic osmotic pressure is at least 3000 Pa.

Example 11 includes the features of any one of Examples 1-10, further comprising fluidly coupling an inlet of the at least one selected filter membrane to a feed stream having the determined organic osmotic pressure.

Example 12 includes the features of any one of Examples 1-10, further comprising fluidly coupling an inlet of the at least one selected filter membrane to a feed stream having the determined organic osmotic pressure to separate dissolved solids of the feed stream from organic content.

Example 13 includes the features of any one of Examples 1-10, further comprising fluidly coupling an inlet of the at least one selected filter membrane to a feed stream having the determined organic osmotic pressure, and wherein the method further comprises producing the permeate stream via the at least one selected filter membrane at a recovery of 100% for a first period of time, and after the first period of time, causing concentrate retained during the first period of time to be expelled.

Example 14 includes the features of Example 13, wherein the method further comprises producing the permeate stream via the at least one selected filter membrane at a recovery of 100% for a second period of time, the second period of time being subsequent to the first period of time, and after the second period of time, causing concentrate retained during the first period of time to be expelled and/or causing regeneration of the at least one selected filter membrane.

Example 15 includes the features of Example 14, further comprising fluidly coupling an inlet of the at least one selected filter membrane to a feed stream to provide the retentate stream with the determined organic osmotic pressure.

Example 16 further includes the features of any one of Examples 14-15, further comprising fluidly coupling an inlet of the at least one selected filter membrane to a feed stream to provide the retentate stream with the determined organic osmotic pressure and separate dissolved solids within the feed stream from organic content.

Example 17 includes the features of Example 16, wherein the method further comprises fluidly coupling a retentate outlet of the at least one filter membrane to a membrane bioreactor arrangement.

Example 18 includes the features of any one of Examples 1-17, wherein the at least one selected filter membrane comprises at least a first filter membrane, and wherein the method further comprises fluidly coupling an inlet of the first filter membrane to the feed stream to provide the retentate stream with the determined organic osmotic pressure and separate dissolved solids within the feed stream from organic content, and fluidly coupling the retentate stream to an inlet of a second filter membrane.

Example 19 includes the features of Example 18, the method further comprising providing thermal treatment to the retentate stream via the second filter membrane for additional recovery or zero liquid discharge.

Example 20 is a filtration system for treatment of a feed stream. The filtration system comprising at least one filter membrane, the at least one filter membrane having a feed channel height of at least 0.5 millimeters and an open channel average velocity of at least 0.2 meters per second, a feed inlet to couple to a feed stream, a permeate outlet to couple to a permeate stream, and a retentate outlet to couple to a retentate stream, a pump fluidly coupled to the inlet of the at least one filter membrane to displace feed from the feed stream into a feed channel of the at least one filter membrane, wherein the feed stream or the retentate stream has an organic osmotic pressure of at least 300 Pascal (Pa), and wherein at least 30% of the feed stream is recovered and output as permeate to the permeate stream by the at least one filter membrane.

Example 21 includes the features of Example 20, wherein the at least one filter membrane comprises a plate and frame membrane module and/or a spiral membrane module with a ladder-style feed spacer.

Example 22 includes the features of any one of Examples 20-21, wherein the at least one filter membrane further comprises a membrane module configured to withstand internal pressures of at least 2 bar.

Example 23 includes the features of any one of Examples 20-22, wherein the at least one filter membrane further comprises a plate and frame membrane module having a feed channel height in a range of 0.7 to 1.2 mm, and/or a spiral membrane with a ladder-style feed spacer with a feed channel height in a range of 0.51 to 1.17 mm.

Example 24 includes the features of any one of Examples 20-23, wherein the open channel average velocity of the at least one filter membrane is in a range of 0.2 to 2.0 meters per second.

Example 25 includes the features of any one of Examples 20-24, wherein the organic osmotic pressure of the feed stream or retentate stream is at least 1500 Pa, and wherein the at least one filter membrane comprises a plate and frame membrane module with a feed channel height in a range of 0.7 to 1.2 mm, and wherein the open channel average velocity is in a range of 0.2 to 2 meters per second.

Example 26 includes the features of any one of Examples 20-25, wherein the organic osmotic pressure of the feed stream or the retentate stream is at least 3000 Pa.

Example 27 includes the features of any one of Examples 20-25, wherein the organic osmotic pressure of the feed stream or the retentate stream is at least 1500 Pa, and the at least one filter membrane is a spiral membrane module with a ladder-style feed spacer and a channel height in a range of 0.51 to 1.17 mm.

Example 28 includes the features of any one of Examples 20-27, wherein the open channel average velocity is in a range of 0.05 to 0.2 meters per second.

Example 29 includes the features of any one of Examples 20-25, wherein the organic osmotic pressure of the feed stream or the retentate stream is at least 3000 Pa.

Example 30 includes the features of any one of Examples 20-25, wherein the feed stream has the organic osmotic pressure of at least 300 Pa.

Example 31 includes the features of any one of Examples 20-25, wherein the retentate stream has the organic osmotic pressure of at least 300 Pa.

Example 32 includes the features of any one of Examples 20-31, wherein the filtration system recovers 100% of the feed stream as permeate via the at least one filter membrane.

Example 33 includes the features of any one of Examples 20-32, wherein the at least one filter membrane comprises at least first and second filter membranes, and wherein the first filter membrane has a permeate outlet or a retentate outlet fluidly coupled to a feed inlet of the second filter membrane.

The foregoing description of several methods and embodiments has been presented for purposes of illustration. It is not intended to be exhaustive or to limit the claims to the precise steps and/or forms disclosed, and obviously many modifications and variations are possible in light of the above teachings.

What is claimed is:

1. A filtration system for treatment of a feed stream, the filtration system comprising:

at least one filter membrane, the at least one filter membrane having a feed channel height of at least 0.5 millimeters, a feed inlet to couple to a feed stream, a permeate outlet to couple to a permeate stream, and a retentate outlet to couple to a retentate stream;

a pump fluidly coupled to the feed inlet of the at least one filter membrane to displace feed from the feed stream into the feed channel of the at least one filter membrane; and a filter controller configured to:

determine an organic osmotic pressure for the feed stream or a retentate stream is at least 300 Pascal (Pa);

in response to determining the organic osmotic pressure is at least 300 Pa, cause the pump to generate an open channel average velocity for the at least one selected filter membrane of at least 0.05 meters per second.

2. The filtration system of claim 1, wherein the at least one filter membrane comprises a plate and frame membrane module and/or a spiral membrane module with a ladder-style feed spacer.

3. The filtration system of claim 1, wherein the at least one filter membrane further comprises a membrane module configured to withstand internal pressures of at least 2 bar.

4. The filtration system of claim 1, wherein the at least one filter membrane comprises a plate and frame membrane module having a feed channel height in a range of 0.7 to 1.2 mm, and/or a spiral membrane with a ladder-style feed spacer with a feed channel height in a range of 0.51 to 1.17 mm.

5. The filtration system of claim 1, wherein the filter controller is configured to cause the pump to generate the open channel average velocity in a range of 0.2 to 2.0 meters per second.

6. The filtration system of claim 1, wherein the filter controller is configured to cause the pump to generate the open channel average velocity in a range of 0.05 to 0.2 meters per second.

7. The filtration system of claim 1, wherein the least one filter membrane comprises a plate and frame membrane module with a feed channel height in a range of 0.7 to 1.2 mm, and wherein the filter controller is configured to cause the pump to generate the open channel average velocity in a range of 0.05 to 0.2 meters per second in response to determining the organic osmotic pressure is at least 1500 Pa.

8. The filtration system of claim 7, wherein the filter controller is configured to cause the pump to generate the open channel average velocity in a range of 0.05 to 0.2 meters per second in response to determining the organic osmotic pressure is at least 3000 Pa.

9. The filtration system of claim 1, wherein the at least one filter membrane comprises a spiral membrane module with a ladder-style feed spacer with channel height in a range of 0.51 to 1.17 mm, and wherein the filter controller is configured to cause the pump to generate the open channel average velocity of at least 0.05 meters per second in response to the control the organic osmotic pressure being at least 1500 Pa.

10. The filtration system of claim 9, wherein the filter controller is configured to cause the pump to generate the open channel average velocity in a range of 0.05 to 0.2 meters per second.

11. The filtration system of claim 10, wherein the filter controller is configured to cause the pump to generate the open channel average velocity in a range of 0.05 to 0.2 meters per second in response to the determined organic osmotic pressure being at least 3000 Pa.

12. The filtration system of claim 1, wherein the filtration system is configured to produce the permeate stream via the at least one selected filter membrane at a recovery of 100% for a first period of time, and after the first period of time and, cause the concentrate retained during the first period of time to be expelled.

13. The filtration system of claim 12, wherein filtration system is further configured to produce the permeate stream via the at least one selected filter membrane at a recovery of 100% for a second period of time, the second period of time being after the concentrate retained during the first period of time is expelled, and after the second period of time, causing concentrate retained during the second period of time to be expelled and/or causing regeneration of the at least one selected filter membrane.

14. The filtration system of claim 1, wherein the filter controller is configured to determine the organic osmotic pressure for the feed stream is at least 300 Pa.

15. The filtration system of claim 1, wherein the filter controller is configured to determine the organic osmotic pressure for the retentate stream is at least 300 Pa.

16. The filtration system of claim 1, further comprising a bioreactor arrangement fluidly coupled to the retentate outlet of the at least one filter membrane.

17. The filtration system of claim 1, wherein the at least one selected filter membrane comprises a first filter membrane and a second filter membrane, wherein an inlet of the first filter membrane is fluidly coupled to the feed stream to provide the retentate stream with the organic osmotic pressure of at least 300 Pa and wherein the retentate stream of the first filter membrane is fluidly coupled to an inlet of the second filter membrane.

18. The filtration system of claim 17, further comprising a thermal system configured to receive to a retentate stream of the second filter membrane.

\* \* \* \* \*